United States Patent
Veeningen

(10) Patent No.: US 11,546,166 B2
(45) Date of Patent: Jan. 3, 2023

(54) HASH TREE COMPUTATION DEVICE

(71) Applicant: KONINKLIJKE PHILIPS N.V., Eindhoven (NL)

(72) Inventor: Meilof Geert Veeningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 585 days.

(21) Appl. No.: 16/451,718

(22) Filed: Jun. 25, 2019

(65) Prior Publication Data

US 2020/0007341 A1     Jan. 2, 2020

Related U.S. Application Data

(60) Provisional application No. 62/693,095, filed on Jul. 2, 2018.

(51) Int. Cl.
  *H04L 29/06*     (2006.01)
  *H04L 9/32*     (2006.01)

(52) U.S. Cl.
  CPC .................... *H04L 9/3236* (2013.01)

(58) Field of Classification Search
  CPC . H04L 2209/38; H04L 9/3236; H04L 9/3239; H04L 9/0643
  See application file for complete search history.

(56) References Cited

U.S. PATENT DOCUMENTS

| 9,679,276 B1* | 6/2017 | Cuende | G06F 16/9014 |
| 2013/0198854 A1* | 8/2013 | Erway | H04L 9/008 726/27 |
| 2019/0103973 A1* | 4/2019 | Chalkias | H04L 63/0876 |

OTHER PUBLICATIONS

Ben-Sasson, et al., "Scalable zero knowledge via cycles of elliptic curves", Cryptology ePrint Archive, Report 2014/595, 2014. http://eprint.iacr.org/2014/595.

O. Goldreich, et al., "Public-key cryptosystems from lattice reduction problems", in Advances in Cryptology—CRYPTO 97, 17th Annual International Cryptology Conference, Santa Barbara, California, USA, Aug. 17-21, 1997, Proceedings, pp. 112-131.

M. Veeningen, "Pinocchio-Based Adaptive zk-SNARKs and Secure/correct Adaptive Function Evaluation", in Progress in Cryptology—AFRICACRYPT 2017—9th International Conference on Cryptology in Africa, Dakar, Senegal, May 24-26, 2017, Proceedings, pp. 21-39.

* cited by examiner

*Primary Examiner* — Yogesh Paliwal

(57) ABSTRACT

Some embodiments are directed to a hash tree computation device. The hash tree computation device computes a top hash of a hash tree. A hash preimage of a leaf node of the hash tree comprises a type of the leaf node. A hash preimage of an internal node of the hash tree comprises a type count comprising a number of descendants of the internal node having a given type. The hash tree computation device computes the top hash by computing hashes of a current node and of its ancestors, where a hash of an ancestor is computed based on its type count, the type count being computed from types or type counts of its descendants.

12 Claims, 8 Drawing Sheets

HASH TREE COMPUTATION DEVICE

CROSS REFERENCE TO RELATED APPLICATION

The present application claims priority to and the benefit of U.S. Provisional Application Ser. No. 62/693,095, filed Jul. 2, 2018, which is hereby incorporated by reference herein.

FIELD OF THE INVENTION

The invention relates to a hash tree computation device, a proof verification device, a hash tree providing device, a hash tree computation method, and a computer readable medium.

BACKGROUND

In many settings, there is a need to efficiently and securely verify contents of large data structures. For example, various systems like database systems, authentication systems or web servers may keep audit logs of particular events, e.g., a database access, a login attempt, or a request by a web browser. An auditor may want to verify that a particular event is present in such an audit log, e.g., that a particular user successfully logged in at a particular time. Similarly, in the Certificate Transparency framework, a log is kept of digital certificates issued to web sites in order to detect certificates being issued to unauthorized parties. As another example, when transferring large files between parties, there is a need to see if the file was correctly transmitted, and if not, which particular part of the file was corrupted.

A method for verifying contents of large data structures is provided in U.S. Pat. No. 4,309,569, "Method of providing digital signatures", included herein by reference, and is also known as a hash tree, or Merkle tree. A hash tree is a tree in which each leaf node is labelled with a cryptographic hash of a data block, and each internal node labelled with the cryptographic hash of the labels of its child nodes. A data block may represent, e.g., an event in an audit log or a part of a large file. Verifying that a leaf node occurs in a hash tree may be performed by computing a number of cryptographic hashes matching the depth of the hash tree, e.g., a number of hashes logarithmic in the number of data blocks. The computation results in a top hash. The computed top hash may be compared to a known, trusted top hash; if there is a match, the leaf node is guaranteed to occur in the hash tree corresponding to the trusted top hash.

A problem of existing hash trees, and hence of devices using them, is that they do not allow to efficiently and securely perform operations on nodes of the hash tree having a given type, e.g., providing or obtaining all nodes of the hash tree having the given type; proving or verifying that all nodes of the hash tree having the given type satisfy a particular property; and the like. For instance, an auditor may want to inspect all events in a log of a particular type, e.g., successful logins, e.g., to check that they satisfy a particular property, e.g., they were performed by a particular user. For instance, it would be beneficial to be able to be able to do this without needing to inspect each event in the log, but while still being sure that all relevant events have been inspected.

It is therefore desirable to provide devices and methods for operating on hash trees that allow to efficiently and securely perform operations on nodes of the hash tree having a given type.

SUMMARY OF THE INVENTION

A hash tree computation device as defined in the claims is proposed. The device computes a top hash of a hash tree with respect to a current node having a given type. A hash preimage of a leaf node comprises a type. A hash preimage of an internal node comprises a type count comprising a number of descendants of the internal node having the given type. The hash tree computation device obtains a hash preimage of the current node, hashes of proof nodes, and types or type counts of proof nodes. The hash tree computation device computes a hash of the current node and hashes of ancestors, including the top hash, where computing a hash of an ancestor comprises computing the type count of said ancestor. The hash tree computation device stores the computed top hash in memory.

Interestingly, since the device obtains the hash preimage of the current node comprising its type, a verification is enabled, by the hash tree computation device and/or other devices, that the current node has the given type. The device furthermore computes one or more hashes of ancestors based on computing their type counts, including the top hash. Therefore, also the computed top hash is based on the type of the current node, which enables a verification, by the hash tree computation device and/or other devices, that the current node is of the given type. Typically, at least some of the leaf nodes and/or internal nodes apart from the current node and its ancestors do not need to be used in order to compute the top hash, e.g., the number of nodes used may be proportional to the depth of the tree rather than its total number of nodes, allowing efficient computation of the top hash with respect to a node having a given type.

In some embodiments, the hash tree computation device is further configured to obtain a set of result nodes comprising leaf nodes of the hash tree having the given type. The size of the set of result nodes matches the type count of the root node of the hash tree. The hash tree computation device iteratively selects a current node and computes hashes with respect to the current node. Advantageously, the size of the set of result nodes matching the type count of the root node and the hash tree computation device computing the top hash with respect to hash preimages of result nodes may guarantee correctness of the set of result nodes, e.g., all result nodes have the given type and/or all non-result nodes do not have the given type, while some or all non-result nodes do not need to be used in the computation.

In some embodiments, the hash tree computation device is configured as a hash tree proving device. The hash tree proving device may compute hashes for nodes from the set of result nodes as a verifiable computation, a cryptographic verifiable computation proof proving that the computation was performed correctly, and send the proof to a proof verification device. Advantageously, the proof may guarantee completeness and/or correctness of the set of result nodes, without proof generation and/or verification and/or the proof itself needing to scale with the total number of leaf nodes in the tree. In an embodiment, the hash tree proving device sends a hash preimage of a current node to the proof verification device, e.g., the device may provide some or all hash preimages, while guaranteeing completeness and/or correctness. In an embodiment, the hash tree proving device performs a node computation on the hash preimage, the cryptographic verifiable computation proving that the node computation was performed correctly, e.g., allowing to show properties about nodes without having to disclose their full preimages. In some embodiments, the set of result nodes is a subset of an extended result set comprising dummy nodes, reducing the need to disclose the size of the set of result nodes to the proof verification device. In an embodiment, a distinctness computation proving that subsequent result nodes have strictly increasing positions may help to ensure that all result nodes in the set of result nodes are distinct.

In some embodiments, the hash tree computation device is configured as a hash tree verifying device. The device compares the computed top hash to a known top hash, based on receiving from a hash tree providing device the hash preimage of the current node as well as at least one of a type, a type count, a hash, and a hash preimage of a proof node for a node from the set of result nodes. Thereby, the device may obtain assurance about correctness and/or completeness of the set of result nodes, e.g., while not needing to compute the received types, type counts hashes, and/or hash preimages.

In some embodiments, the hash tree computation device is configured as a hash tree updating device. The device stores hashes, type counts, and/or hash preimages before an update phase, computes the set of hashes in the update phase, and stores computed hashes, preimages, and/or type counts in memory after the update phase. Thereby, the hash tree stores device obtains data about the updated hash tree, e.g., for use by devices described herein to process nodes of a given type. Advantageously, because of the way the top hash is computed in the update phase, the hash tree updating device may not need to process all nodes, e.g., all leaf nodes of the hash tree in the update phase while still being able to update the tree.

A further aspect of the invention is a proof verification device configured to verify correctness of a set of result nodes of a given type with respect to a known top hash of a hash tree, as defined in the claims. The proof verification device receives from a hash tree computation device a cryptographic verifiable computation proof proving that a computation comprising the computation of a top hash was performed correctly; and verifies the proof with respect to the given type and the known top hash. Thereby, the proof verification device may obtain guarantees of correctness and/or completeness of the set of result nodes, e.g., that a set of result nodes was correctly obtained and/or a node computation was correctly performed on one or more result nodes, without needing to obtain and/or perform computations on at least some of the nodes of the hash tree, e.g., non-result leaf nodes or hash preimages of result nodes on which a node computation was performed.

A still further aspect of the invention is a hash tree providing device configured to provide a set of result nodes of a hash tree to a hash tree computation device, as defined in the claims. The hash tree providing device obtains a given type, determines a set of result nodes comprising leaf nodes having the given type, and sends a hash preimage of a current node from the set of result nodes and proof information, e.g., comprising hashes, hash preimages, types, and/or type counts, to the hash tree computation device. Thereby, the hash tree providing device may allow the hash tree computation device to verify correctness and/or completeness of the set of result nodes, e.g., without having to disclose and/or provide information about at least some non-result nodes.

Another aspect of the invention is a hash tree computation method as defined in the claims. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a hash tree computation device, FIG. 1b schematically shows an example of an embodiment of a hash tree computation device, FIG. 1c schematically shows an example of an embodiment of a hash tree verification system, FIG. 1d schematically shows an example of an embodiment of a hash tree verification system, FIG. 2 schematically shows an example of an embodiment of a hash tree updating device, FIG. 3 schematically shows an example of an embodiment of a hash tree providing device, FIG. 4 schematically shows an example of an embodiment of a hash tree verifying device, FIG. 5a schematically shows an example of an embodiment of a hash tree proving device, FIG. 5b schematically shows an example of an embodiment of a hash tree proving device, FIG. 6 schematically shows an example of an embodiment of a hash tree proving device, FIG. 7 schematically shows an example of an embodiment of a hash tree computation method, FIG. 8a schematically shows a computer readable medium having a writable part comprising a computer program according to an embodiment, FIG. 8b schematically shows a representation of a processor system according to an embodiment.

LIST OF REFERENCE NUMERALS 102, 103 a hash tree verification system
110, 111 a hash tree computation device
112 a hash tree providing device
113 a hash tree verifying device
114 a hash tree proving device
115 a proof verification device
121, 122, 125 a communication interface
130, 131, 132, 135 a processor
140, 141, 142, 145 a memory
162, 164 a computer network
172 a hash preimage and proof information 174 a cryptographic verifiable computation proof
210 a hash tree updating device
231 a collection unit
232 a counting unit
233 a hashing unit
241 a hash tree
242 a root node
242-244 an internal node
242, 243 an ancestor of the current node
244, 245 a proof node
245-248 a leaf node
246 a current node
242.1, 243.1 a type count of an ancestor of the current node
244.1, 245.1 a type or type count of a proof node
242.2-246.2 a hash of a node
242.2, 243.2 a hash of an ancestor of the current node
242.2 a top hash
246.1 a given type
246.3 a hash preimage of the current node
312 a hash tree providing device
331 a collection unit
332 a sending unit
341 a hash tree
342 a root node
343, 344, 345, 348 a proof node
346, 347 a result node
346, 347 a current node
349 a given type
345.1, 348.1 a type or type count of a proof node
345.2, 348.2 a hash of a proof node
346.3, 347.3 a hash preimage of the current node
413 a hash tree verifying device
431 a collection unit
432 a counting unit
433 a hashing unit
442, 443, 444 an ancestor of the current node
443, 444, 445, 448 a proof node
446, 447 a result node
446, 447 a current node
442.1, 443.1, 444.1 a type count of an ancestor of the current node
442.2-447.2 a hash of a node
442.2, 443.2, 444.2 a hash of an ancestor of the current node
445.1, 448.1 a type or type count of a proof node
445.2, 448.2 a hash of a proof node
446.3, 447.3 a hash preimage of a current node
814 a hash tree proving device
831 a collection unit
832 a counting unit
833 a hashing unit
837 a node computation unit
874 a cryptographic verifiable computation proof
514 a hash tree proving device
531 a collection unit
534 a sorting unit
535 an increasement checking unit
546, 547 a result node
549.1, 549.2 a position of a result node
550 a position increase
614 a hash tree proving device
631 a collection unit
632 a counting unit
633 a hashing unit
636 a root hash verification unit
637 a node computation unit
642.2, 642.2' a computed hash of the root node
642, 642', 644, 654 an ancestor 643, 647, 652, 653 a proof node
648, 651 a current node
648 a result node
651 a dummy node
655 a known top hash
700 a hash tree computation method
701 obtaining a hash preimage, a set of hashes, and a set of types or type counts
702 computing a hash and a set of hashes
721 computing a type count
703 storing the computed top hash in a memory
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1A:
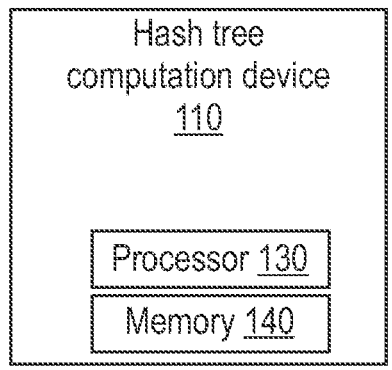

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Embodiments presented herein relate to various devices and/or methods involving the computation of a top hash of a hash tree. A node of the hash tree has a hash, the top hash being a hash of a root node of the hash tree. A hash preimage of a leaf node comprises a type and a hash preimage of an internal node comprises a type count. A type count of an internal node comprises a number of descendants of the internal node having a given type. Various examples of such hash trees are provided below.

In various embodiments described below, such hash trees may be used by various hash tree computation devices. Such hash tree computation devices may have in common that they comprise processors configured to compute hashes of the hash tree including a top hash using similar steps, e.g., by obtaining various information about the hash tree and computing hashes and type counts of nodes in the hash tree, as detailed below. Various embodiments of hash tree computation devices may have various roles in a hash tree verification system, e.g., embodiments of such hash tree computation devices may be hash tree updating devices, hash tree verifying devices, and/or hash tree proving devices. Other devices such as hash tree providing devices or proof verification devices may be configured to use such hash trees as well, e.g., performing other roles in a hash tree verification system. Generally speaking, various devices may use hash trees as described herein to achieve a number of advantages, e.g., allowing to provide or obtain information contained in the hash tree with improved protection against intentional or unintentional corruption, and the like.

Figure 1B:
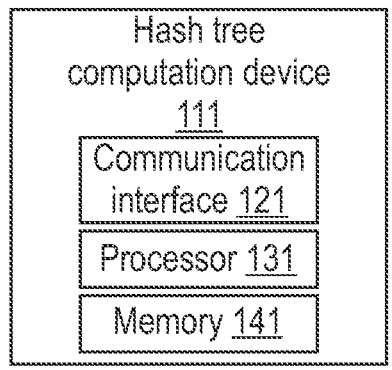

FIG. 1a and FIG. 1b schematically show possible embodiments of hash tree computation devices for computing a top hash of a hash tree with respect to a current node. Hash tree computation device 110 shown in FIG. 1a comprises a processor 130 and a memory 140. Hash tree computation device 111 shown in FIG. 1b comprises a communication interface 121, a processor 131, and a memory 141. For example, memories 140, 141 may comprise software and/or data on which respective processors 130, 131 are configured to act. Processors 130, 131 may be implemented as one or more processor circuits, e.g., microprocessors, ASICs, FPGAs, and the like. The processors may be provisioned, e.g., within a cloud computing architecture, etc. Further examples are shown herein. Memories 140, 141 may comprise computer program instructions which are executable by respective processors 130, 131. Processors 130, 131, possibly together with respective memories 140, 141, are configured according to an embodiment of a hash tree computation device.

Examples of hash tree computation devices include hash tree updating devices, hash tree verifying devices, and hash tree proving devices. A hash tree updating device may store various information about a hash tree; then, in an update phase, compute a set of hashes including the top hash, e.g., in response to nodes of the hash tree being added, removed, re-ordered, or changed; and store the updated hashes its memory. A hash tree verification device may obtain a set of nodes of a given type and compute the top hash with respect to such nodes, e.g., to verify correctness and/or completeness of the set of nodes, e.g., based on data provided by a hash tree providing device. A hash tree proving device may obtain a set of nodes of a given type and compute the top hash with respect to such nodes as a verifiable computation, e.g., to provide correctness assurances concerning the set of result nodes to a proof verification device. Various embodiments of such devices are described below.

Figure 1C:
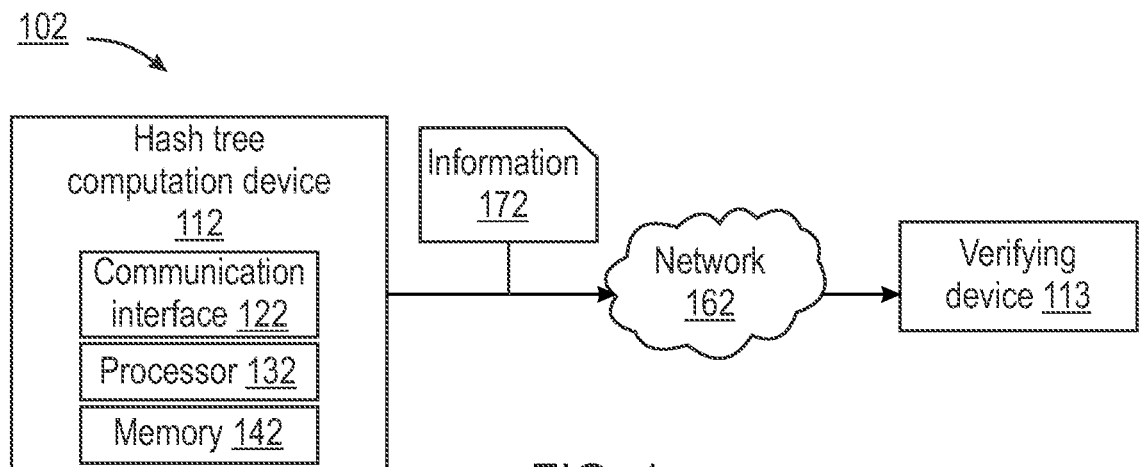

FIG. 1c schematically shows an example of an embodiment of a hash tree verification system 102. Hash tree verification system 102 comprises hash tree providing device 112 and hash tree verifying device 113, connected by a computer network 162. Hash tree providing device 112 is configured to provide a set of result nodes of a hash tree to hash tree verifying device 113. In particular, as elaborated below, hash tree providing device 112 is configured to send hash preimages of current nodes selected from the set of result nodes and proof information 172 to hash tree verifying device 113 over computer network 162. Hash tree verifying device 113, which is a hash tree computation device, is configured to receive these hash preimages and this proof information, compute the top hash of the hash tree and compare it to a known top hash. Thereby, hash tree verifying device 113 may verify the correctness and/or completeness of the set of result nodes. Examples of embodiments of hash tree verifying devices are described in more detail below.

Hash tree providing device 112 comprises communication interface 122, processor 132, and memory 142. For example, memory 142 may comprise software and/or data on which processor 132 is configured to exact. Processor 132 and/or memory 142 may be implemented similarly to processors 130, 131 and memories 140, 141 as described above. Hash tree verifying device 113 is a hash tree computation device, e.g., hash tree verifying device 113 may be hash tree computation device 110 or 111.

Hash tree providing device 112 and hash tree verifying device 113 in hash tree verification system 102 may communicate with each other over computer network 162. The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. Hash tree providing device 112 and hash tree verifying device 113 may comprise communication interfaces, e.g., communication interface 122 or communication interface 121 in FIG. 1b, which are arranged to communicate with other devices of system 102 as needed. For example, the communication interface may comprise a connector, e.g., a wired connector, e.g., an Ethernet connector, or a wireless connector, e.g., an antenna, e.g., a Wi-Fi, 4G or 5G antenna. The computer network may comprise known elements such as, e.g., a router, a hub, etc. Communication may be in the form of digital messages, e.g., send and received in electronic form. Although not shown in FIG. 1c, apart from devices 112, 113, hash tree verification system 102 may be configured with additional computation devices.

Figure 1D:
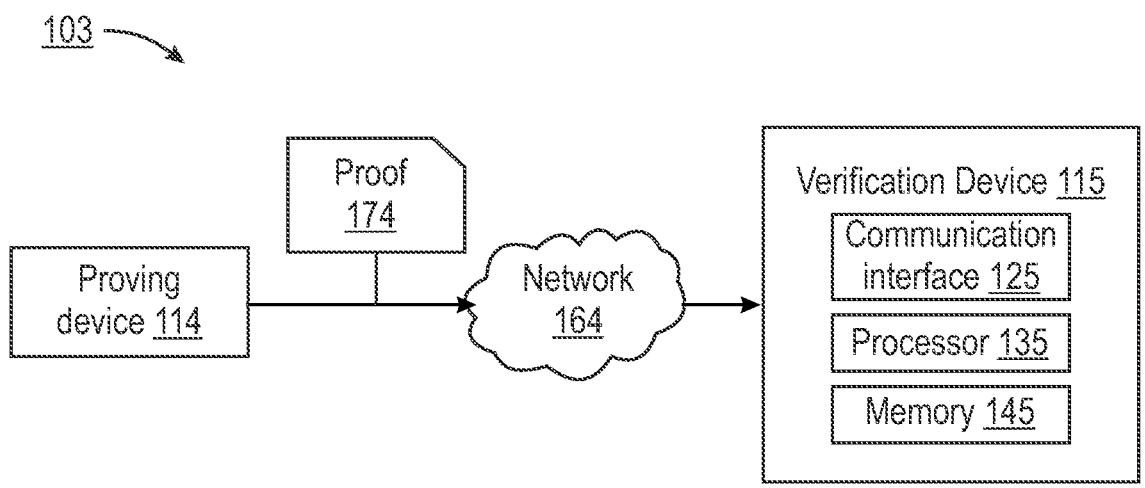

FIG. 1d schematically shows an example of an embodiment of a hash tree verification system 103. Hash tree verification system 103 comprises hash tree proving device 114 and proof verification device 115, connected by a computer network 164. Hash tree proving device 114 may be configured to send a cryptographic verifiable computation proof 174 to proof verification device 115 over computer network 164. The proof may prove that a computation of hashes of the hash tree, including a top hash, was performed correctly. Proof verification device 115 may be configured to verify correctness of a set of result nodes by receiving the cryptographic verifiable computation proof 174 and verifying the proof, thereby obtaining, e.g., correctness and/or completeness guarantees concerning the set of result nodes.

Proof verification device 115 comprises communication interface 125, processor 135, and memory 145. For example, memory 145 may comprise software and/or data on which processor 135 is configured to exact. Processor 135 and/or memory 145 may be implemented similarly to processors 130, 131 and memories 140, 141 as described above. Hash tree proving device 114 is a hash tree computation device, e.g., hash tree proving device 114 may be hash tree computation device 110 or 111. Hash tree proving device 114 and proof verification device 115 in hash tree verification system 103 may communicate with each other over computer network 164. Computer network 164 and communication interfaces of hash tree proving device 114 and proof verification device 115 may be implemented similarly to the computer network and communication interfaces in FIG. 1c. Although not shown in FIG. 1d, apart from devices 114, 115, hash tree verification system 103 may be configured with additional computation devices.

Figure 2:
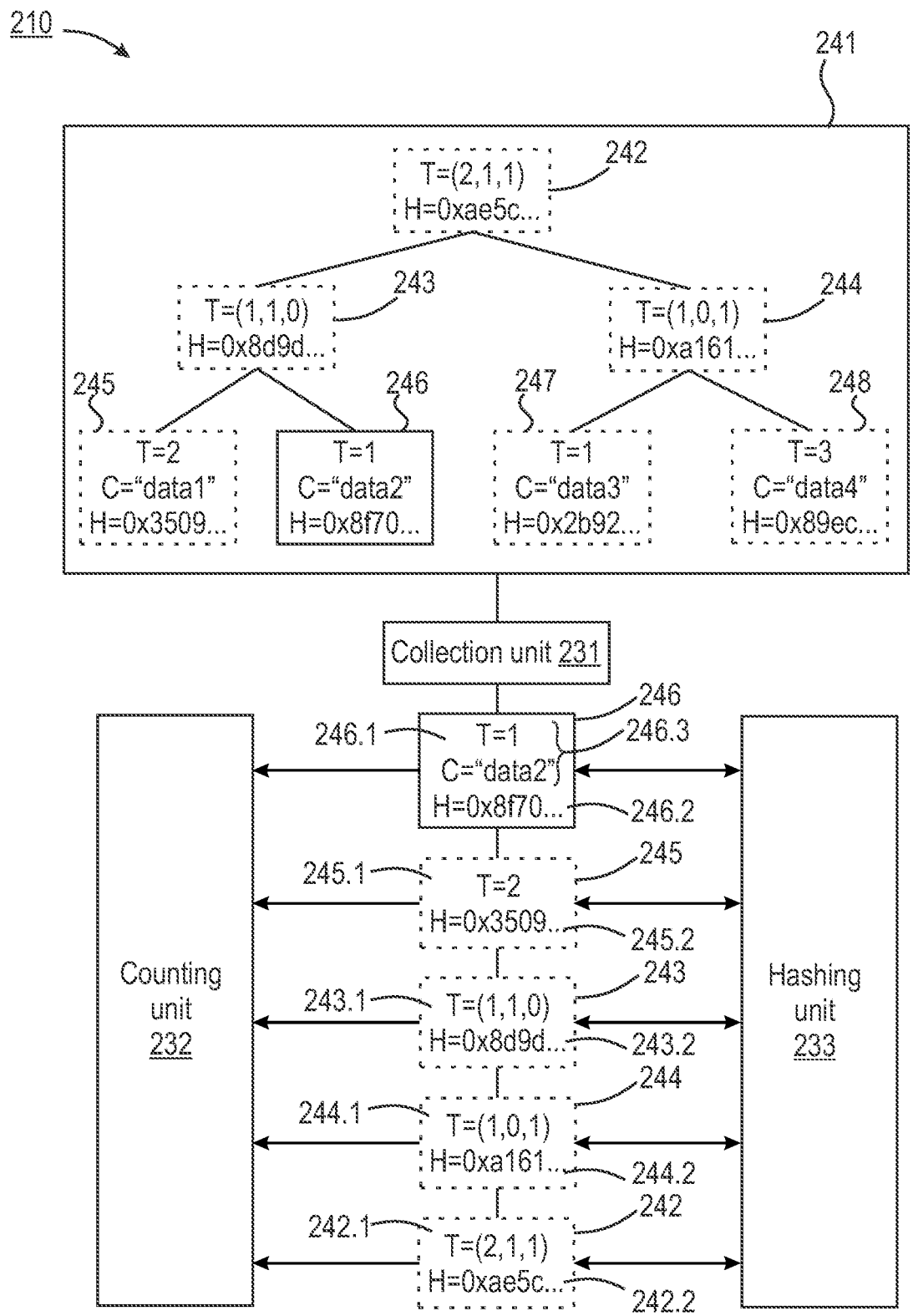

FIG. 2, 3, 4, 5a, 5b, 6 below show functional units that may be functional units of processors. For example, FIG. 2 may be used as a blueprint of a possible functional organization of the processor. The processors are not shown separate from the units in the figures but are shown in devices 110, 111, 112, and 115 in FIG. 1a-FIG. 1d. For example, the functional units shown in FIG. 2, 4, 5a, 5b, or 6 may be wholly or partially implemented in computer instructions that are stored at device 110, e.g., in an electronic memory of device 110, and are executable by a microprocessor of device 110, and similarly for device 111, whereas the functional units shown in FIG. 3 may be wholly or partially implemented in computer instructions that are stored at device 112, e.g., in an electronic memory of device 112, and are executable by a microprocessor of device 112. In hybrid embodiments, functional units are implemented partially in hardware, e.g., as coprocessors, e.g., crypto processors, and partially in software stored and executed on device 110, 111, 112, and/or 115.

FIG. 2 shows an example of an embodiment of a hash tree updating device 210, which is a hash tree computation device. As pointed out above, FIG. 2 shows functional units which may be implemented by the processor, e.g., processor 130 of hash tree computation device 110 or processor 131 of hash tree computation device 111. FIG. 2 also shows some data elements for the purpose of explication. Hash tree updating device 210 is configured to compute a top hash of a hash tree with respect to a current node, the current node being a leaf node. Hash tree 241 may represent various types of information, e.g., hash tree 241 may represent an audit log, with nodes of the hash tree representing audit log events; or hash tree 241 may represent a set of documents or a set of information, e.g., a certificate transparency log, a collection of photographs, or any other set of information.

Hash tree updating device 210 is configured to compute a top hash of hash tree 241 with respect to a current node, for instance, in response to changes to the hash tree, in an update phase, and store the computed top hash in its memory, e.g., memory 140 of device 110 or memory 141 of device 111. For example, hash tree updating device 210 may compute the top hash initially and subsequently in response to changes to the hash tree, or periodically, possibly processing more than one change at the same time. Thereby, hash tree updating device 210 may ensure that the computed top hash reflects the changes to the hash tree, which may guarantee that data, e.g., leaf node contents, that is obtained with respect to the computed top hash reflects these changes as well, for example as described below. This may guarantee correctness and/or completeness of such data in the face of intentional and/of unintentional corruption. Hash tree updating device 210 may by configured to provide the computed top hash to other devices, e.g., to publish the computed top hash or to send the computed top hash to another device via a communication interface, e.g., periodically or after each update.

FIG. 2 shows hash tree 241 comprising nodes 242-248. Node 246, indicated as a solid box, is the current node with respect to which the top hash of hash tree 241 is computed. Hash tree 241 may be a binary tree, e.g., each internal node has a left child and a right child, as shown in FIG. 2, but this is not necessary, e.g., tree 241 may also be k-ary tree for another value of k, e.g., each internal node has at most k children. Value k may for instance be configurable or preconfigured. Tree 241 may be a full and/or perfect and/or complete binary or k-ary tree, but this is not necessary, e.g., some internal nodes may not have exactly 2 or k children. The tree may have arbitrary depth, e.g., the depth may change dynamically as data is added to it. In the example shown in FIG. 2, node 242 is a root node, nodes 242-244 are internal nodes, and node 245-248 are leaf nodes. Nodes 243, 244 are children of node 242; nodes 245, 246 are children of node 243; and nodes 247, 248 are children of node 244. Nodes 242, 243 are ancestors of current node 246.

Nodes of the hash tree may have hashes, e.g., each node of hash tree 241 may have a hash associated to it. For example, node 242 has a hash associated to it that is shown in the figure as "H=0xae5c . . . ". The top hash is a hash of a root node of the hash tree, e.g., of node 242 of hash tree 241. A hash may be obtained from a hash preimage by applying a hash function. A hash function may be a function that maps a hash preimage to a hash of fixed size. A hash function may map preimages of arbitrary size to a fixed-size hash, or preimages of a fixed size, e.g., a size that is larger than the size of the resulting hash. In some embodiments, the hash function is a cryptographic hash function, e.g., a hash function that satisfies, or is assumed to satisfy, advantageous cryptographic properties such as pre-image resistance, second pre-image resistance, and/or collision resistance. Many such hash functions are known from the literature, e.g., SHA-1 or SHA-2.

In some embodiments, the hash function is the Ajtai-GGH hash function. For example, the hash of a preimage is obtained by multiplying the preimage with a random publicly known matrix modulo an integer. For instance, the Ajtai-GGH hash function may be instantiated by letting M be a random matrix of size 64×7296 with entries in the interval $[0,2^{19}-1]$. For instance, M may be hard-coded, or generated from a publicly known seed by a pseudorandom generator. Hash function H: $\{0,1\}^{7296} \to [0,2^{19}-1]^{64}$ may be defined as $H(v):=M \cdot v \mod 2^{19}$. On input a 7296-bit preimage, this hash function produces 1216-bit hashes, e.g., if the preimage comprises two hashes, then apart from this it may comprise 4864 bits of additional information.

Hash tree 241 comprises leaf nodes, e.g., nodes with no children. For example, hash tree 241 comprises leaf nodes 245-248. A hash preimage of a leaf node of hash tree 241 comprises a content of the leaf node and a type of the leaf node. For example, leaf node 245 has content "data1", leaf node 246 has content "data2", etcetera. The content of a leaf node may be of a fixed length, e.g., contents of all leaf nodes have the same fixed length, e.g., 16 bytes, 128 bytes, or 1 kilobyte. For example, the content of a leaf node may be padded or truncated to the fixed length. In an embodiment, the content of a leaf node has a fixed length of 2432 bits. However, the content of a leaf node may also have an arbitrary length, e.g., the content of a leaf node may be a file, e.g., an image or a document, of arbitrary length. The content of a leaf node may comprise metadata, e.g., a modification date, an access permission, and/or a file name of a document. In an embodiment a leaf node of the hash tree represents an audit log event, e.g., an audit log event logged on a device running Microsoft Windows by means of the Windows Event Log API, an audit log event logged by the Apache web server or an authentication system, or similar.

The type of a leaf node may be a type from a set of types, e.g., a set of numbers, codes, or similar. In the example shown in FIG. 2, node 245 has type 2, as indicated with the text "T=2", node 246 as type 1, etcetera. For example, type 1 may represent a particular type of audit log event, e.g., a successful login, and type 2 may represent another type of audit log event, e.g., a failed login attempt. The type of a leaf node may be a fixed part of the hash preimage of the leaf node, e.g., the type of the leaf node may be contained in the hash preimage at a particular location with a particular length, e.g., the first or last byte of the hash preimage may represent the type, or the type of the leaf node may be contained in the hash preimage at another predictable location, e.g., the hash preimage is encoded as common separated values (CSV) and the type is the second value encoded in the hash preimage. In some embodiments, the type is not explicitly contained in the hash preimage but instead can be derived from it, e.g., the type corresponding to a hash preimage is derived by applying a function to the hash preimage, e.g., the type of a leaf node representing an image may be a property of the image, for instance the type may be "greyscale" if the image only comprises greyscale pixels. Typically, the set of types is a known, finite set, e.g., a set of integers from a known range, e.g., 1-152, but this is not necessary, e.g., the set of types may be infinite, e.g., a type may be an arbitrary-length string.

The type of an internal node being comprised in or otherwise derivable from the hash preimage of the node has the advantage that it is possible to perform operations in a well-defined way on all equally-typed nodes in the tree, e.g., collecting all nodes of a given type, performing an operation on all nodes of a given type, or collecting a statistic on all nodes of a given type. Some embodiments described below relate to obtaining a set of result nodes comprising leaf nodes of the hash tree having a given type, e.g., all leaf nodes of tree 241 of type 1, e.g., all leaf nodes representing unsuccessful login attempts. The type being comprised by or otherwise derivable from the hash preimage of the node may guarantee integrity of the type with respect to the hash, e.g., intentional or unintentional corruption of the type of a leaf node may be detected by recomputing and checking the hash. For example, in combination with the other techniques herein, types of leaf nodes being comprised in their hash preimages may allow to check that a set of result node comprises all leaf nodes of a given type despite intentional or unintentional data corruption, e.g., by deterring that the size of the set of result nodes does not match types or type counts used to compute a top hash and/or that a computed top hash does not give an expected result, e.g., does not match a known top hash.

In an embodiment, leaf nodes have types from a set of types, e.g., of size 152, that can each be assumed to occur at most a predetermined number of times, e.g., $2^{32}$ times, in the hash tree. For a leaf node having type t described by contents $n \in \{0,1\}^{2432}$ e.g., a bitstring of length 2432 bits, the hash preimage of the leaf node may be defined as $\delta_{t,1}|\delta_{t,2}| \ldots |\delta_{t,152}|n$, where the number $\delta_{i,j}$ is 1 if i=j and 0 otherwise, encoded as a 32-bit integer, and | denotes concatenation of bitstrings. Such a hash preimage has length 7296 and may be used, e.g., in combination with the Ajtai-GGH hash function described before, e.g., to obtain a hash comprising 1216 bits.

Hash tree 241 may also comprise internal nodes, e.g., nodes with at least one child. For example, hash tree 241 comprises internal nodes 242-244, node 242 having children 243, 244; node 243 having children 245, 256; and node 244 having children 247, 248. A hash preimage of an internal node of hash tree 241 comprises at least one hash of a child of the internal node, e.g., a hash preimage of an internal node may comprise a concatenation of hashes of its children. For example, the hash preimage of internal node 243 may comprise hashes of nodes 245 and 246, the hash preimage of internal node 244 may comprise the hashes of nodes 247 and 248, and the hash preimage of internal node 242 may comprise the hashes of nodes 243 and 244. The part of the hash preimage of the internal node comprising the concatenation of the hashes of its children may be of a fixed length, e.g., if tree 241 is a k-ary tree and the hash function gives hashes of length l bits, then the part may be k*l bits long. If the internal node does not have k children, then a default value may be substituted for its hash, e.g., comprising l times the zero bit.

Interestingly, the hash preimage of an internal node additionally comprises a type count of the internal node. The type count comprises at least a number of descendants of the internal node having the given type, where the given type may be the type of the current node 246 with respect to which the top hash of hash tree 241 is computed. A descendant of a node is a node reachable by repeated proceeding from parent to child. For example, the descendants of node 243 may be nodes 245 and 246; the descendants of node 244 may be nodes 247 and 248; and the descendants of node 242 may be nodes 243-248. The type of current node 246 may be 1 and node 247 may also have type 1, so the type counts of node 242, 243, and 244 may comprise 2, 1, and 1 as respective numbers of descendants having the given type.

The type count of an internal node may also comprise numbers of descendants of the node having other types, e.g., a number of descendants of the internal node having a second type, having a third type, and so on. For example, the type count may comprise a number of descendants of a type for all types from a set of types, e.g., all possible types. In the example shown in FIG. 2, the set of types may comprise types 1, 2, and 3, the type count of an internal node comprising numbers of descendants of the node having type 1, type 2, and type 3, respectively. For instance, internal node 243 may have type count (1,1,0) indicating that the numbers of descendants of types 1, 2, and 3 are 1, 1, and 0 respectively, and so on. Generally, a type being comprised in the set of types may allow devices according to embodiments described herein to provide and/or obtain a set of result nodes comprising leaf nodes of the hash tree having that type, and/or proof and/or verify that such a set of result nodes comprises all leaf nodes of the hash tree having that type.

Type counts being comprised by hash preimages of internal nodes has the advantage that intentional or unintentional corruption of type counts associated to internal nodes can be detected by recomputing and checking the hash. For example, in combination with other techniques described herein, type counts of internal nodes being comprised by their hash preimages may allow to check that a set of result node comprises all leaf nodes of the given type despite intentional or unintentional data corruption.

In an embodiment, a type count of an internal node comprises a number of descendants of a child of the internal node having the given type. For example, the type count of an internal node may comprise a number of descendants of each child having the given type. For example, in a binary tree, the type count of an internal node may comprise a number of descendants of its left child, including the child itself, having the given type and a number of descendants of its right child, including the child itself, having the given type. In this case, the number of descendants of the internal node itself having the given type may be implicitly represented in the type count, since it can be computed as the sum of the number descendants of its children having the given type. The type count of the internal node may also comprise numbers of descendants of children of the internal nodes having other types, e.g., all types from a set of types. Representing numbers of descendants of children instead of, or in addition to, numbers of descendants of the node itself may allow for more efficient protection against intentionally or unintentionally faulty hash trees, e.g., computed by faulty hash trees updating devices, as will be discussed in more detail later.

A type count of an internal node may be represented in various ways in its preimage, e.g., as an array of counts of respective types, e.g., a fixed-length array, or as a sequence of type-count pairs, each pair comprising a type and a number of descendants having said type, e.g., a pair is included in the sequence for every type occurring in the subtree rooted at the internal node, or using any other kind of representation. A type count, e.g., a variable-length type count such as a sequence of type-count pairs, may also be represented as a hash in the hash preimage, which may have the advantage that the required length of the hash preimage of the internal node may be decreased.

In an embodiment, the hash function used to compute hashes is the Ajtai-GGH hash function and leaf nodes of the hash tree have types from a set types, e.g., 152 types, e.g., numbered 1 to 152. Tree 241 may be a binary tree. Each event type may be assumed to occur at most a fixed number of times, e.g., $2^{32}$ times, in hash tree 241. For an internal node of hash tree 241 where the left child has hash preimage $n_l = c_1|c_2|\ldots|c_{152}|n$ and the right child has hash preimage $n_r = c'_1|c'_2|\ldots|c'_{152}|n'$, the hash preimage of the internal node may be $c_1+c'_1|c_2+c'_2|\ldots|c_{152}+c'_{152}|H(n_l)|H(n_r)$, where H is the hash function.

Hash tree updating device 210 is configured to compute top hash 242.2 of hash tree 241 in an update phase. Before the update phase, hash tree updating device 210 stores hashes and type counts of internal nodes and hashes and hash preimages of leaf nodes of the hash tree in a memory, e.g. memory 140 of hash tree computation device 110 or memory 141 of hash tree computation device 111. For example, hash tree updating device 210 stores hashes and type counts of internal nodes 242, 243 and 244, and hashes and hash preimages of leaf nodes 245, 246, 247, and 248. It is not necessary for hash tree updating device 210 to store all hashes and/or type counts of the hash tree, e.g., some hashes or type counts may be computed on-the-fly as required, e.g., to save memory at the expense of an increase in computation. During the update phase, hash tree updating device 210 computes the top hash of hash tree 241 with respect to current node 246. For example, current node 246 may have been inserted into the hash tree or current node 246 may have been updated, necessitating a computation of top hash 242.2 to bring it up to date with hash tree 241. Interestingly, because of the update of the top hash, the top hash reflects the updated types of leaf nodes and type counts of internal nodes, which may contribute to ensuring that data corruption is prevented with respect to the updated types and type counts.

In some cases, the hash preimage of current node 246 may have been updated since the previous computation of the top hash, e.g., the content and/or type of node 246 has changed. For example, leaf nodes of hash tree 241 represent documents and the document represented by current node 246 has been updated, e.g., by a user. If the hash preimage of current node 246 has been updated, in order for the hash tree stored in the memory to reflect the update, hash tree updating device 210 needs to compute a hash 246.2 of current node 246 and a set of hashes of ancestors of the current node, the computed hashes comprising the top hash, in the update phase. For example, in FIG. 2, current node 246 has ancestors 242, 243, and hash tree computation device may compute hash 246.2 of current node 246 and hashes 242.2, 243.2 of these ancestors 242, including top hash 242.2. As discussed in more detail below, computing a hash 242.2, 243.2 of an ancestor of the current node comprises computing a type count 243.1, 242.1 of said ancestor from types or type counts of children of said ancestor. After the update phase, hash tree updating device 210 may store hash preimage 246.1 of the current node, the computed hashes 242.2, 243.2, 246.2 and/or the computed type counts 243.1, 242.1 of ancestor nodes of current node 246 in the memory, for example, all computed hashes and type counts or a subset of them, e.g., some of the information is not stored but computed on-the-fly when required at a later stage.

In other cases, current node 246 may have been inserted, e.g., appended, in the hash tree since the previous computation of the top hash, e.g., the hash tree did not previously contain current node 246. For example, leaf nodes of hash tree 241 represent audit log events and current node 246 represents a new event that has been inserted into the audit log. Hash tree updating device 210 may be configured to perform the insertion, e.g., to receive a representation of the current node 246 that is to be inserted, e.g., a hash preimage of the current node, and insert the current node into the hash tree 241. Various ways of inserting current node 246 to hash tree 241 are possible. For example, hash tree updating device 210 may select an internal node to which current node 246 is inserted as a child, e.g., hash tree 241 is a k-ary tree and an internal node is selected with fewer than k children, e.g., hash tree 241 is a binary tree and an internal node is selected with only one child. Or, hash tree updating device 210 may select a leaf node that is replaced by an internal node having the selected leaf node and current node 246 as children. Inserting may comprise other operations, e.g., a rebalancing operation, e.g., of a balanced binary search tree, or a retracing operation, e.g., of an AVL tree, or similar.

Similarly to an update, in order for the hash tree stored in the memory to reflect an insertion, hash tree updating device 210 needs to compute a number of hashes, comprising at least a hash 246.2 of current node 246 and a set of hashes of ancestors of the current node, where the computed hashes comprise top hash 242.2, in the update phase. Hashes of other nodes may need to be computed as well, e.g., hashes may need to be computed of any internal node for which the subtree rooted at the internal node was modified as a result of the insertion into the hash tree, e.g., as a result of rebalancing, retracing, or other modifications of hash tree 241. As discussed in more detail below, computing the hashes comprises computing type counts, and after the update phase, the hash preimage of the current node and the computed hashes and type counts are stored in the memory.

In some embodiments, hash tree 241 is a binary tree where all leaf nodes have the same depth. In order to append current node 246 to such a hash tree, hash tree computation device may check if the hash tree 241 is a perfect binary tree. If so, hash tree updating device 210 replaces the root of hash tree 241 by a new internal note with the replaced root as a left child, and a subtree comprising the current node as a right subtree, e.g., such that the current node has the same depth as other leaf nodes. If hash tree 241 is not a perfect binary tree, hash tree updating device may insert the current node as a leaf node with the same depth as the other leaf nodes, e.g., at the leftmost available position, e.g., inserting any missing internal nodes on the path from the root of hash tree 241 to the leftmost available position with the same depth as the other leaf nodes. In either case, to bring hash tree 241 up-to-date with the insertion of current node 246, hash tree computation device 210 may need to compute a hash of the current node and a set of hashes of ancestors of the current node, where the computed hashes comprise top hash 242.2.

In some embodiments, hash tree updating device 210 may be configured to compute top hash 242.2 of hash tree 241 based on more than one update or insertion of a leaf node, e.g., based on multiple updates of hash preimages of leaf nodes, multiple insertions of leaf nodes into hash tree 241, or a combination thereof. For example, in FIG. 2, both current node 246 and leaf node 247 may be updated. In such cases, hash tree updating device 210 may compute hashes of updated nodes, including current node 246, and ancestors of updated nodes, including ancestors of current node 246. For internal nodes that are ancestors of multiple updated nodes, e.g., root node 241, it may be sufficient to compute their hashes only once in the update phase, as opposed to computing their hashes for each updated node that they are an ancestor of, e.g., hash tree computation device may be configured to determine a common set of ancestor nodes that are ancestors of an updated node, and compute hashes of ancestors from the common set of ancestor nodes. For example, if current node 246 and leaf node 247 are updated, the common set of ancestor nodes may comprise nodes 242, 243, and 244, and hash tree updating device 210 may update the hash tree 241 stored in memory by comping hashes 243.2, 244.2, and 242.2 of said ancestor nodes.

As demonstrated by the various examples given above, in the update phase, hash tree updating device 210 needs to compute hash 246.2 of current node 246 and a set of hashes 242.2, 243.2 of ancestors 242, 243 of current node 246, the computed hashes 242.2, 243.2, 246.2 comprising the top hash 246.2. To this end, hash tree updating device 210 may comprise a collection unit 231, a counting unit 232, and a hashing unit 233.

Collection unit 231 may obtain information for use by counting unit 232 and/or hashing unit 233. In particular, collection unit 231 may obtain hash preimage 246.3 of current node 246. Moreover, collection unit 231 may obtain information about a set of proof nodes, e.g., nodes 244 and 245 in FIG. 2. The set of proof nodes may comprise siblings of current node 246, e.g., node 245, and siblings of ancestors of current node 246, e.g., sibling 244 of ancestor 243 of current node 246. In particular, collection unit 231 obtains a set of hashes of proof nodes, e.g., proof node 244 or 245, from the set of proof nodes. Hashes of proof nodes may need to be obtained because they occur in hash preimages of ancestors of current node 246, e.g., hash 244.2 of hash 244.2 may occur in the hash preimage of node 242. Hence, collection unit 231 may obtain hash 244.2 of proof node 244 in order to facilitate hashing unit 233 computing hash 242.2 of ancestor 242 of current node 246. Interestingly, collection unit 231 may also obtain a set of types or type counts 244.1, 245.1 of proof nodes 244, 245 from the set of proof nodes. This may facilitate computing type counts of ancestors of current node 246, e.g., type count 242.1 of node 242 may be computed type count 244.1 of proof node 244, e.g., by counting unit 232. Hence, collection unit 231 may facilitate computing type count 242.1 and thereby top hash 242.2 whose hash preimage comprises type count 242, hence contributing to ensuring that data corruption is prevented with respect to the updated types and type counts.

The memory of hash tree updating device 210, e.g., memory 140 or 141, of hash tree, may be configured to store hashes and type counts of internal nodes and hashes and hash preimages of leaf nodes of hash tree 241 before an update phase. Hence, collection unit 231 may obtain the hash preimage 246.3, the set of hashes 244.2, 245.2 and/or the set of types or type counts 244.1, 245.1 by retrieving this information from the memory.

Counting unit 232 of hash tree updating device 210 may compute type counts of one or more ancestors of current node 246, e.g., ancestors 242 and 243. A type count of an ancestor, e.g., type count 243.1 of ancestor 243 or type count 242.1 of ancestor 242, may be computed from types or type counts of children of the ancestor. For example, type count 243.1 may be computed from type 245.1 of leaf node 245 and type 246.1 of leaf node 246, and type count 242.1 of node 242 may be computed from type count 243.1 of internal node 243 and type count 244.1 of internal node 244. Advantageously, the children of the ancestor may be comprised by the set of proof nodes and the current node so that the types or type counts of the children are available, e.g., because they are either computed by counting unit 232, e.g., the child node is the current node or an ancestor of the current node; or because they are obtained by collection unit 231, e.g., the child node is a proof node whose type or type count has been obtained.

Computing the type count of an internal node comprises at least computing the number of descendants of the internal node having the given type, e.g. by determining for each child node of the internal node that is a leaf node whether it has the given type, and/or by determining for each child node of the internal node that is an internal node the number of descendants of the child node that have the given type, and adding the results. As indicated above, changes to hash tree 241 may necessitate computing hashes of nodes of hash tree 241 that are not ancestors of the current node 246, and counting unit 232 may be configured to compute type counts of one or more of those nodes as well, e.g., counting unit 232 may compute type counts of all internal nodes whose children have been updated. In general, computing types count of internal nodes is advantageous for including a correct type count in the hash preimage of the internal node, facilitating the prevention of data corruption with respect to the type count.

For instance, in order to determine type count 243.1 of node 243, counting unit 232 may determine that child 245 does not have the given type and that child 246 does have the given type, and hence determine the number of its descendants having the given type as 1. As discussed, for leaf nodes, their type may be explicitly contained in or derivable from the preimage, where in the latter case counting unit 232 may need to derive the type. As another example, in order to determine type count 242.1 of node 242, counting unit 232 may determine from the count 244.1 of proof node 244 obtained by collection unit 231 that the number of descendants of node 244 with the given type is 1, and combine this with the computed number of descendants of node 243 with the given type, to determine that the number of descendants of node 242 with the given type is 2.

Although not shown in FIG. 2, an internal node may have both leaf nodes and internal nodes as children and may compute its type count from the types or type counts of its children accordingly. As discussed above, a type count of an internal node may also comprise numbers of descendants of the internal node having other types, which are determined similarly to the number of descendants having the given type. A type count of an internal may comprise numbers of descendants of children of the node having the given type and/or other types, that are also computed analogously. As also discussed above, type counts may be represented in various ways in the hash preimage of an internal node, e.g., as an array of counts or a sequence of type-count pairs, and counting unit 232 may be configured to compute a representation of the type count appropriate for the hash preimage of the internal node.

Hashing unit 233 of hash tree updating device 210 may compute hash 246.3 of current node 246 and a set of hashes 242.3, 243.3 of ancestors 242, 243 of current node 246. The computed hashes may comprise top hash 242.3. Hashing unit 232 may compute hashes by applying the hash function to respective hash preimages, e.g., obtained by collection unit 231. Hashing unit 231 may compute a hash, e.g., hash 242.3 or 243.4, of an ancestor, e.g., ancestor 242 or 243, of current node 246 based on a type count of said ancestor as computed by counting unit 232. The hash preimage of an ancestor comprises a type count of the internal node, e.g., as computed by counting unit 232, and at least one hash of a child of the internal node, and hashing unit 231 may compute the hash by applying the hash function to the type count and the at least one hash of a child of the ancestor, e.g., hashing unit 231 may compute hash 243.2 of node 243 by applying the hash function to a hash preimage comprising type count 243.1 and hashes 245.2 of node 245 and 246.2 of node 246. Similarly, hashing unit 231 may compute hash 242.2 of node 242 by applying the hash function to a hash preimage comprising type count 242.1 and hashes 243.2 of node 243 and 244.2 of node 244.

After the update phase, hashing unit 233 of hash tree updating device 210 may store one or more of hash 246.2 and hash preimage 246.3 of current node 246 and the computed hashes 242.2, 243.2 and type counts 242.1, 243.1 of ancestor nodes 242, 243 of current node 246 in a memory, e.g. memory 140 of device 110 or memory 141 of device 111. This has the advantage that updated hash tree information is stored in the memory, which is advantageous, e.g., for later further updating the hash tree and/or acting as a hash tree providing device. For example, hash tree updating device 210 may be a hash tree providing device, examples of embodiments of which are described herein. Hash tree updating device 210 may also send information about hash tree 241, e.g., hashes and types or type counts, to a hash tree providing device, e.g., updated hash preimages of leaf nodes and hashes and types or type counts of updated nodes in the hash tree, e.g., hash tree updating device sends this information periodically or in the event of an update.

In particular, hashing unit 231 of hash tree updating device 210 may store computed top hash 242.2 in memory, e.g., memory 140 or 141. This may have the advantage that the stored top hash is updated to reflect the changes in the hash tree, enabling authentication of data from the updated hash tree with respect to the updated top hash, e.g., by hash tree providing devices, hash tree verifying devices, or hash tree proving devices, and/or proof verification devices, examples of which are given below. Hash tree updating device 210 may be further configured to output top hash 242.2, e.g., to provide the top hash as an output to the user, or to provide the top hash to another device, e.g., for authentication of data from the updated hash tree, for example using digital communication.

Figure 3:
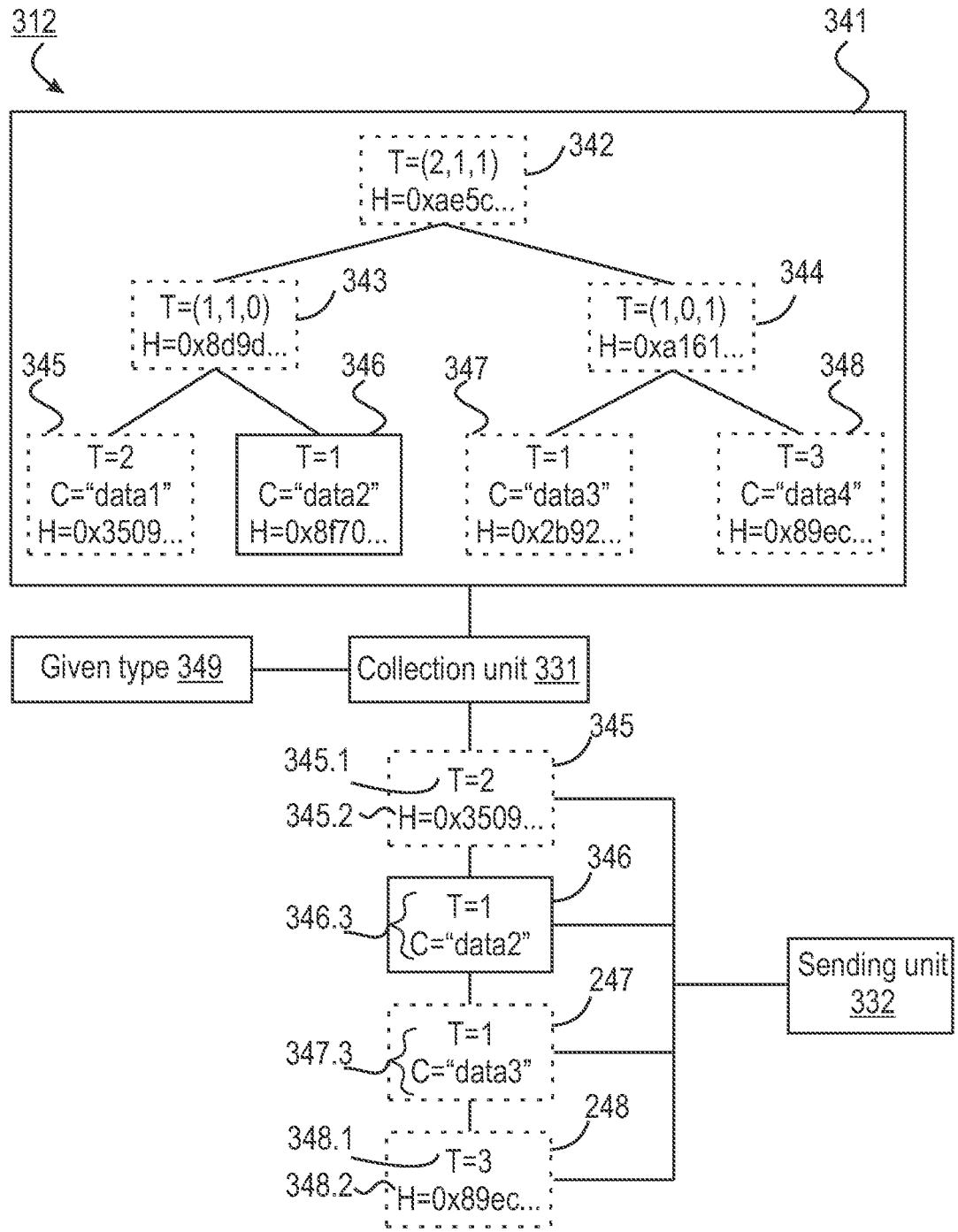
Figure 4:
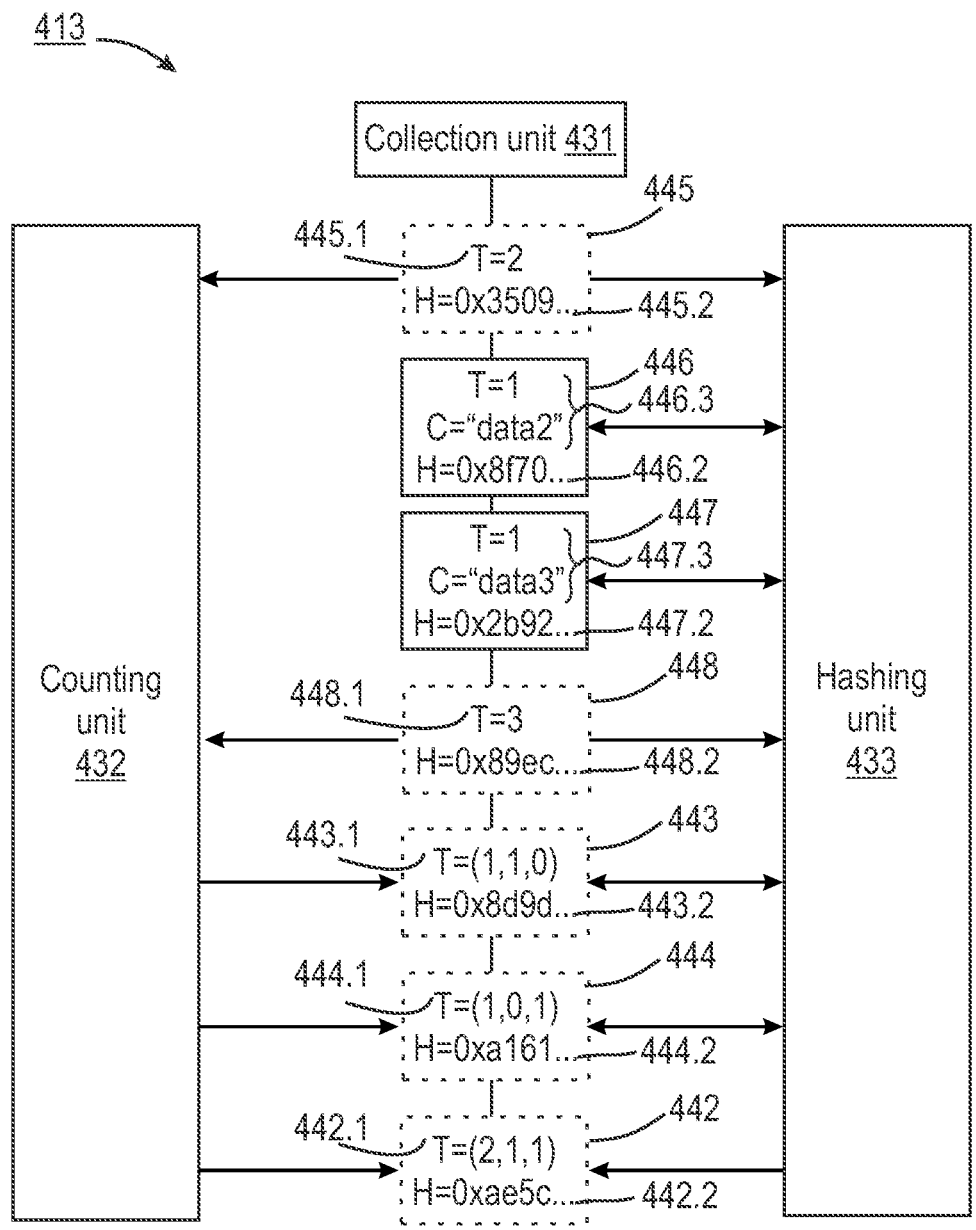

Continuing with FIG. 1c, as discussed, a hash tree verification system 102 is shown comprising hash tree providing device 112 and hash tree verifying device 113. An example of an embodiment of hash tree providing device 112 is shown as hash tree providing device 312 in FIG. 3. An example of an embodiment of hash tree verifying device 113 is as hash tree verifying device 413 shown in FIG. 4. Hash tree verifying device 113 is a hash tree computation device, e.g., hash tree computation device 110 or 111. As pointed out above, FIG. 3 and FIG. 4 show functional units which may be implemented by the processor, e.g., processor 130 of hash tree computation device 110 or processor 132 of hash tree providing device 112. FIG. 3 and FIG. 4 also shows some data elements for the purpose of explication.

Hash tree providing device 112, e.g., hash tree providing device 312, stores information about a hash tree, e.g., hash tree 341; determines a set of result nodes of the hash tree; and provides it to hash tree verifying device 113, e.g., hash tree verifying device 413. The set of result nodes comprises leaf nodes of the hash tree having a given type. For example, hash tree verifying device 113 may be configured to send a request to hash tree providing device 112 to provide result nodes having the given type. The size of the set of result nodes matches the type count of the root node of the hash tree, e.g., the number of descendants comprised by the type count equals the size of the set of result nodes. Hash tree verifying device 113, e.g., hash tree verifying device 413, receives information about the set of result nodes from hash tree providing device 112, computes the top hash, and compares it to a known top hash. The computed top hash matching the known top hash may guarantee to hash tree verifying device 113 that the obtained result nodes indeed occur in the hash tree corresponding to the top hash, e.g., the hash tree with respect to which the known top hash was computed; moreover, interestingly, the use of type counts in computing the top hash may guarantee that the size of the set of result nodes matches the number of leaf nodes with the given type in the hash tree with respect to which the known top hash was corrupted, e.g., it guarantees that the set of result nodes is complete. Hence, comparing the computed top hash to the known top may help to prevent deliberate and/or accidental data corruption in the hash tree and/or guarantee correctness of obtained results.

As discussed above, hash tree providing device 112 and hash tree verifying device 113 both use a hash tree like the hash tree used in hash tree updating device 210, e.g., hashes of the hash tree have been computed by a hash tree updating device. In particular, a node of the hash tree has a hash; a hash preimage of a leaf node of the hash tree comprises a content of the leaf node and a type of the leaf node; a hash preimage of an internal node of the hash tree comprises a type count of the internal node and at least one hash of a child of the internal node; and a type count of an internal node of the hash tree comprises a number of descendants of the internal node having the given type. Various embodiments of hash trees are discussed with reference to hash tree 241 of FIG. 2. FIG. 3 shows hash tree 341 of hash tree providing device 312 comprising nodes 342-348. Hash tree 341 has the same contents as hash tree 241; unlike in hash tree 241, nodes 346 and 347 are current nodes and nodes 345, 348 are proof nodes, as explained in more detail below. FIG. 4 shows nodes 442-448 having the same contents as nodes 342-348.

Turning to FIG. 3. FIG. 3 shows a hash tree providing device 312 configured to provide a set of result nodes of a hash tree to a computation device. The memory of hash tree providing device 312, e.g., memory 142 (not shown separately in FIG. 3) may be configured to store hash preimages of leaf nodes 345-348 of hash tree 341. For example, FIG. 3 shows hash preimage 346.3 of leaf node 346 and hash preimage 347.3 of leaf node 347; the memory 142 may also store hash preimages of the other leaf nodes (not shown in the figure). The memory may also be configured to store hashes and types or type counts of nodes 342-348 of the hash tree, e.g., type 345.1 and hash 345.2 of node 345 and type 348.1 and hash 348.2 of node 348; memory 142 may also store types or type counts of the other nodes (not shown in the figure). Hash tree providing device 312 may store only some information, e.g., hashes and/or type counts in the memory, e.g., computing or otherwise obtaining other information on-the-fly when required.

For example, hash tree providing device 312 may be a hash tree updating device which has previously computed hashes and type counts of hash tree 341 in an update phase and stored them in memory. Or, hash tree providing device 312 may have received information about hash tree 341, e.g., hashes and types or type counts, from a hash tree updating device, e.g., hash tree providing device 312 is configured to receive update information about hash tree 341, e.g., updated hash preimages of leaf nodes and hashes and types or type counts of updated nodes in the hash tree, e.g., hash tree providing device receives this information periodically or in the event of an update, e.g., from a hash tree updating device.

Hash tree providing device 312 comprises collection unit 331. Collection unit 331 obtains given type 349: for example, collection unit 331 receives given type 349 from the hash tree computation device via a communication interface, collection unit 331 receives given type 349 as an input by a user, or given type 349 is obtained otherwise, e.g., it is hard-coded. Collection unit 331 then determines the set of result nodes, e.g., result nodes 346, 347. The size of the set of result nodes matches the type count of the root node 342 of hash tree 341, e.g., root node 342 of hash tree 341 has a type count comprising a number of descendants of the root node having given type 349, and the size of the set of result nodes is equal to this number of descendants. For example, hash tree providing device 312 keeps an index of nodes of particular types including the given type and determines the set of result nodes based on the index.

Hash tree providing device 312 may iteratively repeat a computation in order to provide the set of result nodes, e.g., their hash preimages, to hash tree verifying device 113, e.g., using collection unit 331 and/or sending unit 332. The computation may be iteratively repeated for all result nodes in the set of result nodes.

The iteratively repeated computation may comprise collection unit 331 selecting a current node from the set of result nodes. For example, the set of result nodes may comprise nodes 346, 347 and collection unit 331 may select node 346 as the current node in a first iteration and node 347 as the current node in a second iteration. For example, collection unit 331 may iterate linearly through the determined set of result nodes. Collection unit 331 may also perform the determining of the set of result nodes and the selecting of the current nodes in an interleaved way or in parallel, e.g., collection unit 331 may traverse the nodes of hash tree 341, for example, using a depth-first search or any other traversal technique, and for each encountered leaf node, check if the node is of the given type 349; if so, it may select the current node to be the encountered leaf node. For example, if interleaving is used, it may not be necessary to explicitly store the set of result nodes in memory.

The iteratively repeated computation may further comprise collection unit 331 retrieving from the memory a hash preimage of the current node and proof information about a set of proof nodes. The set of proof nodes may comprise siblings of the current node and siblings of ancestors of the current node. The proof information may comprise hashes, hash preimages, types, and/or type counts of zero or more proof nodes from the set of proof nodes. In an embodiment, the proof information comprises a set of hashes of proof nodes from a set of proof nodes, and a set of types or type counts of proof nodes from the set of proof nodes, for example, the proof information may comprise hashes and types or type counts of all siblings of the current node and all siblings of ancestors of the current node. In some embodiments, the proof information comprises hash preimages of proof nodes, e.g., instead of hashes of the proof nodes, e.g., so that hash tree verifying device 113 may compute hashes from respective hash preimages. In some embodiments, the proof information comprises information about a subset of siblings of the current node and ancestors of the current node, for example, only information that hash tree verifying device 113 is not otherwise able to determine. For instance, the proof information may only comprise information about siblings that are not themselves result nodes or ancestors of result nodes, and/or that were not part of a set of proof nodes of another iteration of the iteratively repeated computation. For example, proof information of different iterations may be determined sequentially, where collection unit 331 determines successive proof information so as to only contain information that was not determined in previous iterations nor information about result nodes or ancestors of result nodes.

In some iteratively iterated computations, the proof information may be empty, for example, if a current node is selected in an iteratively iterated computation that is a sibling of a previously selected current node, then no additional hashes and types or type counts may need to be retrieved and sent since the relevant hashes and types or type counts may have been processed previously. Interestingly, however, the proof information in at least one iteratively repeated computation comprises at least one of a hash, a hash preimage, a type, and a type count of a proof node from the set of proof nodes, e.g., a hash preimage or a type count and a hash. This may allow hash tree verifying device 113 to perform its verification, including the computation of the type count comprised in the top hash of the hash tree, without having to recompute these hashes, hash preimages, types or type counts.

Hash tree providing device 312 may further comprise a sending unit 332 that, as part of the iteratively repeated computation, sends the hash preimage of the current node and the proof information to hash tree verifying device 113, e.g., it sends this information 172 over computer network 162. The various iteratively repeated computations may be performed interleaved or in parallel and, in particular, the sending from different iteratively repeated computations may be combined, e.g., sending unit 332 may send a single message comprising information from multiple, e.g., all, iteratively repeated computations to hash tree verifying device 113. Sending unit 332 may additionally send the size of the set of result nodes or send information about subsequent current nodes separated by a termination message.

For example, collection unit 331 may determine that the set of result nodes of hash tree 341 for given type 1, 349 comprises result nodes 346, 347. In the iteratively repeated computation, collection unit 331 may select node 346 as the current node in the first iteration. Collection unit 331 may retrieve hash preimage 346.3 of current node 346 from memory. The set of proof nodes for node 346 may comprise its sibling 345 and sibling 344 of its ancestor 343. Collection unit 331 may retrieve a set of hashes of proof nodes from memory comprising hash 345.2 of proof node 345, and a set of types or type counts of proof nodes comprising type count 345.1 of proof node 345. Collection unit 331 may select hash 345.2 and type 345.1 of node 345 because node 345 is a proof node that has not been selected in a previous iteration and it is not a result node 346, 347 or an ancestor 342, 343, 344 of a result node. For example, hash tree verification device 113 may need this information to compute the top hash of the hash tree. On the other hand, collection unit 331 may not select the hash of proof node 344 since node 344 is an ancestor of result node 347, e.g., hash tree verification device 113 may not need this information to compute the top hash of the hash tree since it may compute the hash and type count of node 344 based on information about its children 347, 348 including result node 347. Sending unit 332 may send the retrieved information to hash tree verifying device 113.

In the second iteration of the iteratively repeated computation, collection unit 331 may select node 347 as the current node and retrieve hash preimage 347.3 of current node 347. The set of proof nodes of current node 347 may comprise sibling 348 of current node 347 and sibling 343 of ancestor 344 of current node 347. Collection unit 331 may retrieve a set of hashes of proof nodes and a set of types or type counts of proof nodes comprising hash 348.2 and type 348.1 from memory and sending unit 332 may send the retrieved information. Similarly to above, information about proof node 348 may be retrieved and sent since the information has not been retrieved in the previous iteration and the node is not a result node or an ancestor of a result node; information about proof node 343 may not be retrieved and sent since node 343 is an ancestor of result node 346.

In other embodiments, however, collection unit 331 may not make a selection of proof nodes and simply retrieve information, e.g., hashes and types or type counts, of all proof nodes to be sent by sending unit 332, e.g., all siblings of the current node and of its ancestors. For example, collection unit 331 may first select current node 346 and retrieve hashes and types or type counts of proof nodes 344, 345, and then select current node 347 and retrieve hashes and types or type counts of proof nodes 343, 348. This has the advantage of decreasing dependence of the amount and type of information that is sent on the relations between items in the set of result nodes, e.g., the order and/or type of information sent may be the same for a set of result nodes comprising siblings 345, 346 and for a set of result nodes comprising non-siblings 345, 348. This may facilitate processing by hash tree providing device 312 and/or hash tree verifying device that is simpler and less dependent on the underlying data, e.g., it may provide data-obliviousness advantages such as reducing the amount of side-channel information derivable from the computations being performed by the respective devices.

In some embodiments, hash tree providing device 312 may be configured to send hash preimages of proof nodes to the hash tree verifying device, the hash tree verifying device being configured to compute hashes of proof nodes from their respective preimages. This may have the advantage of providing additional assurance to the hash tree verifying device, e.g., the hash tree verifying device may verify that type counts of all children of ancestors of the current node have been consistently added up to obtain the type count of the ancestor node. This may simplify detection by the hash tree verifying device of certain inconsistently constructed hash trees. For instance, in embodiments wherein a type count of an internal node comprises a number representing a total number of descendants of the given type, a malicious hash tree updating device may construct a hash tree with a type count comprising 1 for each internal node and where each leaf node has the given type. A faulty hash tree providing device that does not send hash preimages of proof nodes in such a case may send type counts of one for all proof nodes, which the hash tree verifying device may not be able to detect. Sending hash preimages of proof nodes may help to prevent this type of undesired behavior, for example, since the hash tree verifying device may detect that type counts of children of the ancestor do not add up to the type count of the ancestor and/or the computed top hash does not match. Sending hash preimages of proof nodes may not be necessary, however, in embodiments wherein a type count of an internal node comprises a number of descendants of a child of the internal node having the given type since this may eliminate the possibility of inconsistencies of the type described here.

Focusing now on FIG. 4, hash tree verifying device 413 is configured to obtain a set of result nodes. As mentioned above, the set of result nodes may comprise leaf nodes of a hash tree of a hash tree providing device 112 having a given type, e.g., hash tree verifying device 413 may be configured to send a request to hash tree providing device 112 to provide result nodes having the given type, or hash tree providing device 112 may be configured to periodically provide the set of result nodes and hash tree verifying device 413 to periodically obtain it.

Hash tree verifying device 413 is a hash tree computation device. Hash tree verifying device 413 may comprising a collection unit 431, a counting unit 432, and/or a hashing unit 433. Hash tree verifying device 413 may iteratively repeat a computation wherein collection unit 431 may select a current node, e.g., a leaf node having the given type, from the set of result nodes and obtain information about the current node; counting unit 432 may compute type counts of ancestors of the current node; and hashing unit 433 may compute hashes of the current node and ancestors of the current node. Hash tree verifying device 413 may perform the iteratively repeated computations subsequently, e.g., in a linear or random order, but iteratively repeated computations may also be interleaved as appropriate, e.g., one iteratively repeated computation may be paused until another iteratively repeated computation has computed data it needs, or iteratively repeated computations maybe performed in parallel. Iteratively repeated computations may also overlap, e.g., partially overlap, e.g., if multiple iteratively repeated computations compute the same data.

The computed hashes comprise top hash 442.2 of the hash tree, the top hash being a hash of a root node 442 of the hash tree. Hashing unit 433 may compare the computed top hash 442.2 to a known top hash (not shown in the figure), e.g., a top hash that was previously obtained, e.g. received from hash tree providing device 112 or another device, downloaded, e.g., from a publicly available website, provided by a user, or hard-coded. Interestingly, the size of the set of result nodes may match the type count of root node 442 of the hash tree. Since the preimage of computed top hash 442.2 comprises type count 442.1 of root node 442, comparing the computed top hash to the known top hash may guarantee not only that the set of result nodes are comprised in the hash tree corresponding to the known top hash, but also that the amount of result nodes matches the type count of the known top hash. For example, it may guarantee that the set of result nodes is both correct and complete, e.g., no accidental or deliberate corruption of the set of result nodes, e.g., by hash tree providing device 112, has taken place.

In more detail, in an iteratively repeated computation, collection unit 431 selects the current node from the set of result nodes. For example, collection unit 431 may receive from hash tree providing device the size of the set of result nodes and keep a counter to indicate the current node in the set of result nodes, or collection unit 431 may receive either information about the current node or a termination message, selecting the current node comprising checking whether the received data comprises the termination message. For example, current nodes in subsequent iteratively repeated computations may comprise current nodes 446, 447.

Collection unit 431 obtains a hash preimage of the current node, a set of hashes of proof nodes from a set of proof nodes, and a set of types or type counts of proof nodes from the set of proof nodes. As discussed with reference to collection units 231 and 331, the set of proof nodes comprises siblings of the current node and siblings of ancestors of the current node. For instance, for current node 446, the set of proof nodes may comprise sibling 445 of node 446 and sibling 444 of ancestor 443; for current node 447, the set of proof nodes may comprise sibling 448 of node 447 and sibling 443 of ancestor 444. Collection unit 431 generally obtains hash preimage 446.3, 447.3 of current node 446, 447 by receiving the hash preimage from hash tree providing device 112. The hash preimage may have been received previously, e.g., from hash tree providing device 112 or another device, e.g., collection unit 431 keeps a cache of previously received hash preimages and only receives, e.g., requests and receives, those hash preimages that are not in its cache or have been updated since the previous receipt.

Collection unit 431 generally obtains hashes from the set of hashes and types or type counts from the set of types or type counts by receiving them from hash tree providing device 112 or as a result of counting unit 432 computing a type count or hashing unit 433 computing a hash, as described below. Collection unit 431 may obtain hashes and/or types and/or type counts of the same node in multiple iteratively repeated computations, in which case it may for example receive the hash and/or type and/or type count from hash tree providing device 112 in one iteratively repeated computation and re-use it in another iteratively repeated computations. As also discussed with respect to collection unit 331 collecting the information received by collection unit 431, collection unit 431 may receive hashes and types or type counts for those nodes that are siblings of the current node but not results node or ancestors of result nodes, and for a particular current node, collection unit 431 may receive only those hashes and types or type counts that it did not already receive for a previous current node before. In other embodiments, collection unit 431 receives hashes and types or type counts of all proof nodes, e.g., it may receive the same hash, type, or type count multiple times, which may allow collection unit 431 to operate in a simpler and more data-oblivious way, e.g., its operation may not depend on the closeness between nodes in the set of result nodes, e.g., improving side-channel resistance. Instead of receiving hashes, collection unit 431 may also receive respective hash preimages and compute the hashes therefrom.

Interestingly, in at least one iteratively repeated computation, collection unit 431 receives at least one of a type, a type count, a hash, and a hash preimage of a proof node from hash tree providing device 112. As a consequence, hash tree verifying device 413 does not need to recompute this type, type count, hash, or hash preimage while still being able to use it to compute the top hash and thereby compare it to the type, type count, hash or hash preimage used to compute the known top hash. For example, the proof node may be an internal node with a type count comprising a total number of descendants of the given type of zero, e.g., the proof node does not have nodes of the given type, e.g., result nodes, as children. By collection unit 431 receiving this type count for later use by counting unit 432 and/or hashing unit 433 for computing top hash 442.2 that is compared to the known top hash, hash tree verifying device 413 may be guaranteed that the subtree rooted at the internal node does not contain nodes of the given type, without having to check any particular leaf nodes of the subtree, contributing to hash tree verifying device 413 being assured that the obtained set of result nodes is complete.

Counting unit 432 computes type counts of ancestors of the current node from types or type counts of children the ancestor, e.g., as obtained by collection unit 431 or a prior computation of counting unit 432 itself. The children of the ancestor are comprised in the set of proof nodes and the current node. For example, counting unit 432 may compute the number of descendants of a node having the given type as the number of children of the node that are leaf nodes of the given type plus the sum of the numbers of descendants of the given type of children of the node that are internal nodes, as comprised by their type counts. The same type count may need to be computed in multiple iteratively repeated computations, e.g., a node is an ancestor of multiple result nodes, in which case counting unit 432 may compute the type count once and re-use it. For example, the computation for a current node may be temporarily paused if it needs a type count that will be computed later, e.g., a type count of an ancestor of a node that has not yet been selected by collection unit 431. Embodiments of counting units are also discussed with reference to counting unit 232 in FIG. 2. Advantageously, counting unit 432 may determine the type of a result node 446, 447 from its hash preimage and may check that the type count of received proof nodes that do not have a result node as a child have a number of descendants of the given type of zero; moreover, counting unit 432 may check that the eventually computed number of descendants of the root node 442 comprised in its type count 442.1 matches the size of the set of result nodes, thereby guaranteeing correctness of the set of result nodes, e.g., result nodes are of the given type and/or the set of result nodes comprises all nodes of the given type, e.g., the set of result node is authentic and accidental and/or deliberate data corruption is prevented.

Hashing unit 433 may compute a hash of the current node and a set of hashes of ancestors of the current node, the latter being based on the type count of the ancestor computed by counting unit 432. The computed hashes comprise top hash 442.2. For instance, hashing unit 433 may compute the hash of a node by computing its preimage, e.g., collecting hashes of children comprised by the preimage and collecting the type count computed by counting unit 432, and applying the hash function to the hash preimage. The same hash may need to be computed in multiple iteratively repeated computations, e.g., a node is an ancestor of multiple result nodes, in which case hashing unit 433 may compute the hash once and re-use it. Embodiments of hashing units are also discussed with reference to hashing unit 232 in FIG. 2. Hashing unit 433 may store the computed top hash 442.2 in memory and compare it to a known top hash, providing authenticity and/or data corruption advantages e.g. as discussed above.

For example, collection unit 431 may select current node 446 in a first iteratively repeated computation. Proof nodes for current node 446 may comprise its sibling 445 and sibling 444 of its ancestor 443. Collection unit 431 may receive hash preimage 446.3 and type 445.1 and hash 445.2 of sibling 445 from hash tree providing device 112 since sibling 445 is not a result node or an ancestor of a result node itself. On other hand, collection unit may not receive hash 444.2 and type count 444.1 of proof node 444 and instead obtain these from hashing unit 443 and counting unit 432 that will later compute this hash and type count, respectively. Hashing unit 433 may compute hash 446.2 of current node 446 from received hash preimage 446.3. Counting unit 432 may then compute type count 443.1 of ancestor 443 of current node 446, e.g. children 445 and 446 have types "2", 445.1 and "1", comprised by preimage 446.3, respectively, hence counting unit 432 may determine type count 443.1 to be (1,1,0). Hashing unit 433 may then compute hash 443.2 of ancestor 433, e.g., by applying the hash function to a hash preimage comprising type count 443.1 and hashes 445.2 and 446.2. Hash 445.2 may be received and hash 446.2 and type count 443.1 may be computed before. Another ancestor of current node 446 may be root node 442. The computation for current node 446 may be paused at this point since ancestor 442 has a child 444 that is an ancestor of a not yet selected result node 447, whose type count and hash still need to be computed.

In a second iteratively repeated computation, collection unit 431 may then select current node 447 having proof nodes 443 and 448. Collection unit may receive hash preimage 447.3 of current node 447 and type 448.1 and hash 448.2 of proof node 448, and no data about proof node 443, e.g., type count 443.1 and hash 443.2 have been computed by units 432, 433 above. Similarly to above, hashing unit 433 may compute hash 447.2 of node 447 from hash preimage 447.3; counting unit 432 may compute type count 444.1 of node 444 from type 448.1 and the type of node 447 comprised by hash preimage 447.3, and hashing unit 433 may compute hash 444.2 of node 444 from type count 444.1, hash 447.2 and hash 448.2. The computation may now proceed with counting unit 432 computing type count 442.1 of root node 442 from computed type counts 443.1 and 444.1 and hashing unit 433 computing top hash 442.2 from type count 442.1, hash 443.2 and hash 444.2. This latter computation of type count 442.1 and hash 442.2 may be part of the iteratively repeated computation for both current node 446 and current node 447.

Finally, hashing unit 433 may compare computed top hash 442.2 to a known top hash; a match may be indicative of the completeness and correctness of the obtained set of result nodes, e.g., received hash preimages 446.3 and 447.3.

In other embodiments, embodiments in which hash tree verifying device 413 receives more data from hash tree providing device 112 but performs the computations in a more data-oblivious way. For instance, for each result node 446, 447 hash tree verifying device 413 may receive a separate set of hashes and types or type counts of proof nodes and compute top hash 442.2, comparing each computed top hash 442.2 to the known top hash. Hash tree verifying device may also receive hash preimages of proof nodes and compute their hashes therefrom, e.g., hash 446.2 or hash 447.2.

In any case, hash tree verifying device 413 may receive the information from hash tree providing device as one or more messages 172 sent over computer network 162, e.g., a single message, a message for each current node, or a message for each node about which information is sent. Hash tree verifying device 413 may also cache information, e.g., some of the information received from hash tree providing device 112 may be stored in memory and used to obtain later sets of result nodes, e.g., cached information may be re-used relating to nodes and/or subtrees that have not been changed between the obtaining of the current set of result nodes and the obtaining of the later set of result nodes.

In some embodiments, a type count of an internal node comprises a number of descendants of a child of the internal node having the given type, or collection unit 431 is further configured to obtain a hash of a proof node by obtaining, e.g., receiving from the hash tree providing device, a hash preimage of the proof node and having hashing unit 433 compute the hash therefrom. As discussed above, both options may have the advantage that they enable detection by the hash tree verifying device of certain inconsistently constructed hash trees, for example, hash trees wherein each leaf node has the given type and each type count of an internal node is one.

Algorithm 1 shown below may be executed by a counting unit and a hashing unit in an embodiment in order to compute a top hash, e.g., by counting unit 242 and hashing unit 233 of a hash tree updating device 210 to compute top hash 242.2 or by counting unit 432 and hashing unit 433 of a hash tree verifying device 413 to compute top hash 242.2 of hash tree 241. Algorithm 1 assumes that the hash tree is a binary tree; that the hash preimage of a leaf node is defined as $\delta_{t,1}|\delta_{t,2}| \ldots |\delta_{t,152}|n$; and that the hash preimage of an internal node is defined as $c_1+c'_1|c_2+c'_2| \ldots |c_{152}+c'_{152}|H(n_l)|H(n_r)$ as described with reference to examples of embodiments of hash tree 241.

Algorithm 1 Computation of top hash 242.2

Require: $p \in \{0,1\}^{d-1}$: position of current node 246 in hash tree 241;
$t \in [1,152]$: given type;
$n_0 \in \{0,1\}^{2432}$: content of current node 246;
$(c_{i,1}', \ldots, c_{i,152}')$: type or type count 244.1, 245.1 of sibling 244, 245 of current node or ancestor at level $i \in [1, d-1]$
$h_i$: hash of sibling 244, 245 of current node or ancestor at level $i \in [1, d-1]$
Ensure: Return values are a type count 242.1 and top hash 242.2 of root node 242 with respect to current node 246
1: function LogVerifyTot(p,t, $n_0$, $\{(c_{i,1}', \ldots, c_{i,152}'), h_i\}_i$)
2:     $c \leftarrow (\delta_{t,1}, \ldots, \delta_{t,152})$
3:     $h \leftarrow H(c_1|c_2| \ldots |c_{152}|n_0)$
4:     for i = 1; ... , d − 1 do
5:        $c \leftarrow (c_1 + c_{d,1}', c_2 + c_{d,2}', \ldots, c_{152} + c_{d,152}')$    // $c_{d,i}$ interpreted as integers
6:        if $p_i = 0$ then $h \leftarrow H(c_1|\ldots |c_{152}|h|h_i)$ else $h \leftarrow H(c_1| \ldots |c_{152}|h_i|h)$
7:     return (c; h)

Function LogVerifyTot may receive as argument a bottom-up position $p_1, \ldots, p_{d-1}$ of current node 246, e.g., $p_1=0$ may indicates that the current node is a left child of its parent and $p_1 \neq 0$ may indicate it is a right child; $p_2=0$ indicates that the parent is a left child of its respective parent and $p_2 \neq 0$ indicates it is a right child, and so on. Argument t may be the given type, given as an integer between 1 and 152, inclusive. $n_0$ may be the content of current node 246, here given as a 2432-bit bitstring. $(c'_{i,1}, \ldots, c'_{i,152})$ may be types or type counts of siblings of the current node, given as a sequence of 32-bit integers indicating the amount of descendants, including the node itself, of type 1, ... , 152.

In line 2, LogVerifyTot may encode type t of current node 246 as a type count, e.g., a sequence of 152 32-bit integers, where $\delta_{x,y}$ is the $\delta$-function, e.g., $\delta_{x,y}=1$ if x=y and 0 otherwise. In line 3, LogVerifyTot may apply hash function H to hash preimage 246.3 of current node 246 comprising its content $n_0$ and type, encoded as value c to compute hash 246.2 of the current node. In lines 4-6, LogVerifyTot may compute a set of hashes of ancestors 242, 243 of the current node. In line 5, LogVerifyTot may compute a type count $(c_1, \ldots, c_{152})$, 242.1, 243.1 from types or type counts ($c_1, \ldots, c_{152}$) and ($c'_{d,1}, \ldots, c'_{d,152}$) of children of an ancestor, in this case, by adding up totals per type as integers. In line 6, LogVerifyTot may compute hash h, 242.2, 243.2 of an ancestor using a computed type count 242.1, 243.1. As discussed, the hash preimage of an internal node may comprises total number of descendants per type, a hash of a left child, and a hash of a right child of the node, respectively. E.g., if current node 246 is in the left subtree of the node, e.g., $p_i=0$, then the hash preimage of its ancestor may be $c_1 | \ldots | c_{152} | h | h_i$ where the previously computed hash h comes before hash $h_i$ of its sibling, otherwise it may be $c_1 | \ldots | c_{152} | h_i | h$ where h comes after $h_i$. Finally, in line 7, LogVerifyTot may return type count c, 242.1 of root node 242 and top hash h, 242.2.

For example, when applied in hash tree updating device 210, LogVerifyTot may be called when the contents of current node 246 have been modified; its arguments may be obtained from the memory of the hash tree updating device; and computed hashes h and type counts c may be stored in the memory. When applied in hash tree verifying device 413, LogVerifyTot may be called for each result node in a set of result nodes, with arguments $n_0$, $\{(c'_{i,1}, \ldots, c'_{i,152}), h_i\}_i$ being received from a hash tree providing device and/or being computed in invocations of LogVerifyTot for other result nodes. Hash tree verifying device 413 may compare value $c_t$ indicating a number of descendants of the root node having the given type to the size of the set of result nodes and/or compare computed top hash h to a known top hash. Hash tree verifying device 413 may obtain hashes $h_i$ provided as arguments to LogVerifyTot from their respective preimages, which may improve protection against malformed hash trees, as discussed above.

For example, to prove that all nodes of a given type t satisfy a given property φ, hash tree providing 312 may provide a list of all positions where a node of the given type occurs in the hash tree. For each item, collection unit 331 may collect the input data to Algorithm 1, specifically, the values p, $n_0$, $\{(c'_{i,1}, \ldots, c'_{i,152}), h_i\}_i$ as detailed in the algorithm. Hash tree verifying device 413, knowing top h of the hash tree and type t to be checked, and upon receiving a list of nodes of the form p, $n_0$, $\{(c'_{i,1}, \ldots, c'_{i,152}), h_i\}_i$, may checks that all given positions are distinct; for each node, checks that $n_0$ satisfies φ, runs (c, h')←LogVerifyTot( . . . ), and check that h'=h; and finally, checks that $c_t$ equals the received number of events and $\Sigma_i c_i$ equals the total number of events in the log, in particular, that $\Sigma c_i \leq 2^{d-1}$ with d the depth of the tree.

Figure 5A:
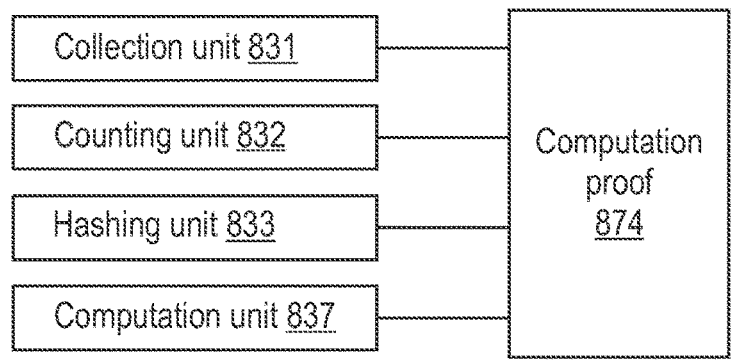

Turning to FIG. 5a, shown is an example of an embodiment of a hash tree proving device 814. Hash tree proving device 814 may be part of a hash tree verification system, e.g., hash tree proving device 814 may be hash tree proving device 114 in hash tree verification system 103. Hash tree proving device 814 is hash tree computation device, e.g., hash tree verification device 110 or 111. Hash tree proving device 814 is configured to send cryptographic verifiable computation proof 874 to proof verification device 115 over a computer network, e.g., computer network 164.

The cryptographic verifiable computation proof used in devices 814 relates to the computation of hashes in a hash tree. A node of the hash tree has a hash. The top hash is a hash of a root node of the hash tree. A hash preimage of a leaf node of the hash tree comprises a content of the leaf node and a type of the leaf node. A hash preimage of an internal node of the hash tree comprises a type count of the internal node and at least one hash of a child of the internal node. A type count of an internal node of the hash tree comprising a number of descendants of the internal node having a given type. Various examples of embodiments of hash trees have been described with reference to hash trees 241 of FIG. 2 and 341 of FIG. 3.

Hash tree proving device 814 may comprise collection unit 831 configured to obtain a set of result nodes comprising leaf nodes of the hash tree having the given type. For example, hash tree proving device 814 is configured to obtain the set of result nodes upon receiving a request from a proof verification device, e.g., proof verification device 115, comprising the given type, e.g., a request to provide the set of result nodes or information derivable from the set of result nodes. The proof verification device, e.g., proof verification device 115, may be configured to send such a request. The size of the set of result nodes may match the type count of the root node of the hash tree.

Collection unit 831 may obtain the set of result nodes from its memory. For example, the memory of hash tree proving device may be configured to store hashes and type counts of internal nodes and hashes and hash preimages of leaf nodes of the hash tree, for example, hash tree proving device 814 is configured as a hash tree updating device such as hash tree updating device 210 or a hash tree providing device such as hash tree providing device 312, with collection unit 831 being configured to operate analogously to their respective collection units 231, 331 as described above. Alternatively, collection unit 831 may obtain the set of result nodes by receiving them from a hash tree providing device, e.g., collection unit 831 is configured to receive hash preimages of current nodes from the set of result nodes from the hash tree providing device. E.g., collection unit 831 is configured to operate analogously to collection unit 431 of hash tree verifying device 413.

Hash tree proving device 832 may further comprise a counting unit 832 and a hashing unit 833 that, together with collection unit 831, are configured to iteratively repeat a computation. The iteratively repeated computation may comprise collection unit 831 obtaining a hash preimage of a current node, a set of hashes of proof nodes from a set of proof nodes, and a set of types or type counts of proof nodes from the set of proof nodes. The set of proof nodes may comprise siblings of the current node and siblings of ancestors of the current node. Again, collection unit 831 may perform this obtaining analogously to collection unit 231, 331 or 431 described above, for example, in at least one iteratively repeated computation, collection unit 831 may receive at least one of a type, a type count, a hash, and a hash preimage of a proof node from the set of proof nodes from a hash tree providing device. The iteratively repeated computation may further comprise hashing unit 833 computing a hash of the current node and a set of hashes of ancestors of the current node. The computed hashes may comprise the top hash. Computing a hash of an ancestor of the current node may comprise counting unit 832 computing a type count of said ancestor from types or type counts of children of said ancestor. The children of said ancestor may be comprised in the set of proof nodes and the current node. Hashing unit 833 may also compute hashes of proof nodes from their respective hash preimages. Hashing unit 833 may be further configured to store the computed top hash in a memory of hash tree proving device 832 (not shown). For example, counting unit 832 and/or hashing unit 833 may be adapted from respective units 232, 233 and/or 432, 433.

Interestingly, counting unit 832 and hashing unit 833 may perform the computation of the hash and set of hashes as a verifiable computation, thereby producing a cryptographic verifiable computation proof 874 proving that this computation was performed correctly. Various techniques for performing verifiable computations are known from the literature. For instance, the computation may be implemented as a C program and executed using the Pinocchio verifiable computation system as described in "Pinocchio: Nearly Practical Verifiable Computation" by Bryan Parno, Jon Howell, Craig Gentry, and Mariana Raykova, proceedings of the 2013 IEEE Symposium on Security and Privacy, included herein by reference. In this system, a computation is performed by means of "Compute" algorithm on an input using a public evaluation key, producing an output and a cryptographic verifiable computation proof of the correctness of the output; the output is verified based on the input and the cryptographic verifiable computation proof using a verification key by means of a "Verify" algorithm.

Cryptographic verifiable computation proof 874 may comprise proofs of multiple sub-computations, e.g., the correctness of computations of different hashes by hashing unit 833 may be proven by respective proofs comprised by cryptographic verifiable computation proof 874, for example, the verifiable computation may be provided as a C program with multiple subroutines and executed using the Geppetto toolchain as described in "Geppetto: Versatile Verifiable Computation" by Craig Costello et al., proceedings of the 2015 IEEE Symposium on Security and Privacy, included herein by reference, or as a Python program with multiple subroutines and executed using the Geppetri toolchain as described in "Pinocchio-Based Adaptive zk-SNARKs and Secure/Correct Adaptive Function Evaluation", Meilof Veeningen, proceedings of AFRICACRYPT 2017, included herein by reference.

The computations performed as a verifiable computation by counting unit 832 and/or hashing unit 833 may be performed analogously to counting and/or hashing units described above, e.g., by counting unit 232 and/or hashing unit 233 adapted to perform their computations as a verifiable computation or counting unit 432 and hashing unit 432 adapted to perform their computations as a verifiable computation.

Returning to FIG. 1d, hash tree proving device 114, e.g., hash tree proving device 814 may send cryptographic verifiable computation proof 874 to proof verification device 115. Advantageously, as a result of using a cryptographic verifiable computation proof, at least some of the information obtained and/or computed as part of computation of the top hash, e.g., hashes and types or type counts of proof nodes or ancestors of the current node, may not need to be provided to the proof verification device 115, e.g., the proof verification device may receive a guarantee that the top hash was computed correctly without the need to learn this information and/or to perform this computation. For example, proof verification device 115 may not need to spend the computational effort to perform the computation. Moreover, no access may need to be provided to proof verification device 115 to some information about the hash tree such as hashes or type counts, e.g., this data does not need to be transferred and/or the proof verification device does not need to store data about the hash tree in memory, e.g., the hash tree may comprise sensitive information that may be kept secret with respect to the proof verification device.

Proof verification device 115 may be configured to verify correctness of the set of result nodes with respect to a known top hash. Proof verification device 115 may be configured to obtain the known top hash, e.g., from a hash tree updating device, as a user input, by downloading, e.g., from a public website, or as a hard-coded input. Proof verification device 115 receives cryptographic computation verifiable computation 174 from hash tree proving device 114, e.g., hash tree proving device 814, and verifies cryptographic verifiable computation proof 174 with respect to the given type and the known top hash. For example, the given type may be an input to the computation proven correct by cryptographic verifiable computation proof 174, and proof verification device 115 may provide this input when verifying the cryptographic verifiable computation proof; the given type may be hardcoded; or the given type may be an output of this computation, and proof verification device 115 may obtain this output when verifying the cryptographic verifiable computation. Similarly, the known top hash may be an input to the computation or output of the computation, with proof verification device 115 verifying the cryptographic verifiable computation proof 174 with respect to this input or output, or the computed top hash may be an output of the verifiable computation, with proof verification device 115 comparing the computed top hash to a known top hash in the plain.

Hash tree proving device 114, e.g., hash tree proving device 814, may be configured to send outputs of the verifiable computation to proof verification device 115, and proof verification device 115 may verify cryptographic verifiable computation proof 174 with respect to the outputs, e.g., the hash preimage of the current node. In an embodiment, outputs of the verifiable computation comprise the hash preimage of the current node. This has the advantage that proof verification device 115 obtains assurance that the hash preimage, e.g. the contents and/or type comprised by the hash preimage, are correct with respect to the known top hash. Moreover, since the verifiable computation comprises computing type counts, proof verification device 115 may receive assurance that the set of result nodes is complete with respect to the known top hash.

In an embodiment, hash tree proving device 114, e.g., hash tree proving device 814, is further configured to perform a node computation on the hash preimage of the current node as a verifiable computation, e.g., hash tree proving device 814 may comprise a node computation unit 837 to perform said node computation. Cryptographic verifiable computation proof 174 may further prove that the node computation was performed correctly. For example, the node computation may have an output, hash tree proving device 114 sending the output to proof verification device 115 and proof verification device 115 receiving the output and verifying the cryptographic verifiable computation proof 174 with respect to the output. For example, the node computation may comprise selecting information from the hash preimage and outputting it and/or computing a statistic or property of such information. The node computation may also comprise a top hash computation itself, e.g. to verify that the hash preimage satisfies a particular property with respect to another node in the tree, e.g., to verify that the node has a different type than a preceding node in the hash tree.

The output of a node computation may also be combined with outputs of other computations, e.g., other node computations, to determine a public combined output, e.g., an aggregate statistic over the set of result nodes, the public combined output being similarly sent, received, and used to verify the proof. It is also possible that the node computation has no output at all, e.g., the node computation may verify that the hash preimage satisfies a particular property, e.g., that an audit log event represented by the current node is not an anomaly, e.g., did not involve a particular user. For example, performing a node computation with no output on all nodes from the set of result nodes may achieve that proof verification device 115 is assured that all nodes of the hash tree of the given type satisfy a certain property, without learning additional information about any nodes of the hash tree. In any case, proof verification device 115 may obtain assurance that the node computation has been performed correctly, without needing to perform the node computation itself and/or needing to know the hash preimage.

Figure 6:
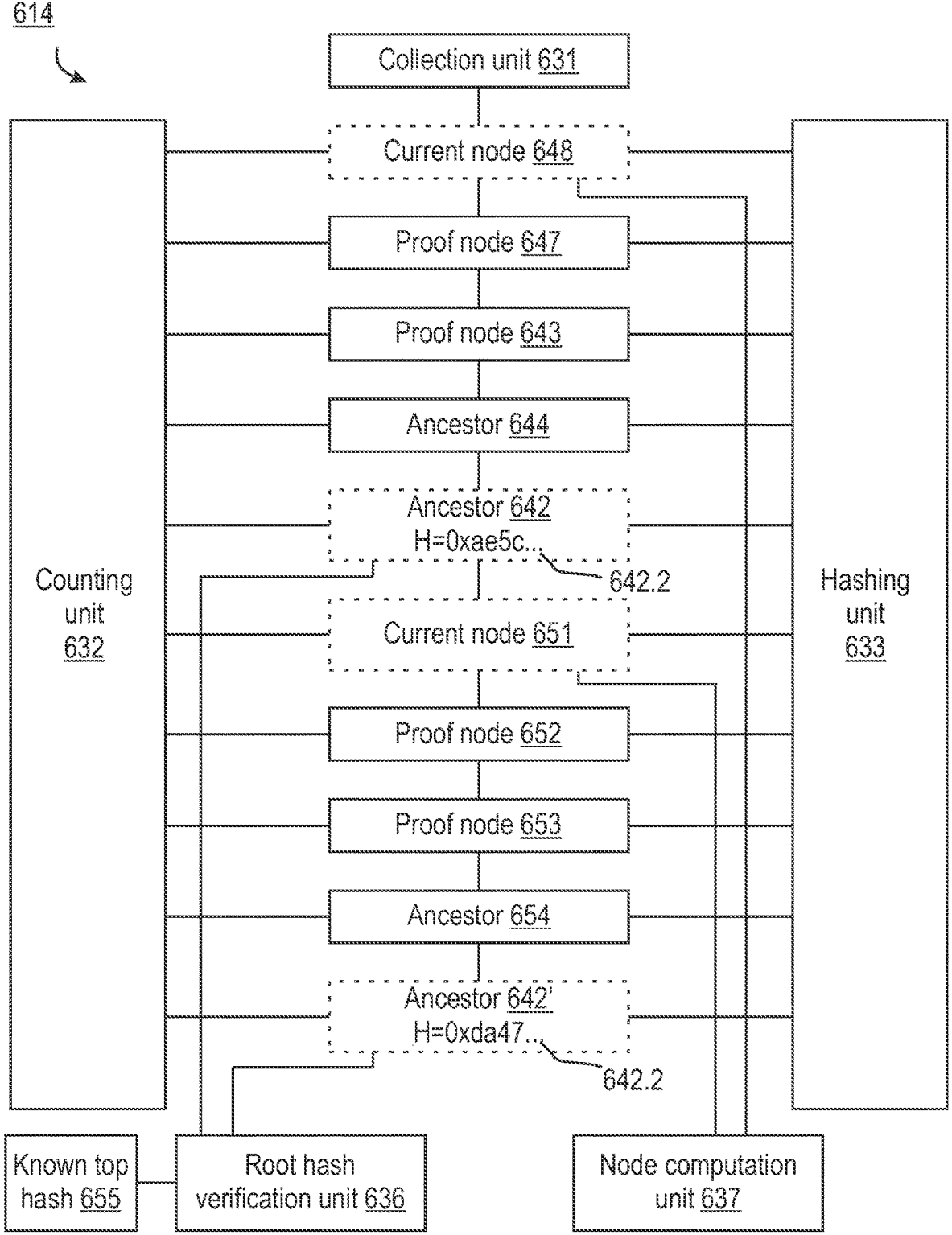

In some embodiments of hash proving devices, the set of result nodes is a subset of an extended result set comprising dummy nodes. FIG. 6 shows an example of such an embodiment of a hash tree proving device 614. Hash tree proving device 614 is a hash tree computation device, e.g., hash tree computation device 110 or 111, or hash tree proving device 114. The use of dummy node may have the advantage that the cryptographic proof produced by hash tree proving device 614 does not disclose the size of the set of result nodes, e.g., proof verification device 115 may learn the size of the extended result set but not the set of result nodes, which may be sensitive. Still, proof verification device 115 may obtain assurance that the set of result nodes used by hash tree proving device 614 is correct, e.g., that a node computation was correctly performed on result nodes.

Hash tree proving device 614 may comprise collection unit 631. As above, collection unit 631 may be configured to obtain the set of result nodes. The set of result nodes may be a subset of the extended result set. For example, collection unit 631 may obtain the set of result nodes as described before, e.g., as described for collection unit 831, e.g. it may obtain a single result node 648. Collection unit 631 may append a number of dummy nodes to obtain an extended result set of a desired size, e.g., a preconfigured or hardcoded size, e.g., collection unit 631 may append dummy node 651 to obtain an extended result set of size two. For each node in the extended result set, collection unit 631 may keep track of a dummy flag indicating whether the node is a result node or a dummy node. A dummy node may or may not correspond to an actual node of the hash tree; for example, it may be a copy of an existing node of the hash tree or it may be arbitrary, e.g., random or hard-coded data.

Hash tree proving device 614 may be further configured to iteratively repeat a computation, e.g., performed by collection unit 631, counting unit 632, hashing unit 633, root hash verification unit 636, and/or node computation unit 637 of hash tree proving device 614. The iteratively repeated computation may comprise collection unit 631 selecting the current node from the set of result nodes. The selecting may comprise selecting the current node from the extended result set, e.g., the iteratively repeated computation is iteratively repeated for nodes of the extended result set, e.g., all nodes of the extended result set, e.g., nodes 648 and 651. Collection unit 631 may also select nodes from the result set, e.g., analogously to collection unit 431 or 831 described above, e.g., node 648, and then separately, e.g., aftwards, select as many dummy nodes as are needed, e.g., dummy node 651, to reach a predetermined size of the extended result set.

The iteratively repeated computation may further comprise collection unit 631 obtaining a hash preimage of the current node, a set of hashes of proof nodes from a set of proof nodes, and a set of types or type counts of proof nodes from the set of proof nodes, the set of proof nodes comprising siblings of the current node and siblings of ancestors of the current node. If the current node is a result node, the obtaining may be performed analogously to collection units described before, e.g., collection unit 831. For example, for current node 648, collection unit 831 may obtain hashes and types or type counts about a set of proof nodes comprising proof nodes 643 and 647. If the current node is a dummy node, random or hard-coded data, may be obtained. If the current node is a dummy node that corresponds to an actual node of the hash tree, also data corresponding to that actual node may be obtained. For example, for current node 651, collection unit 631 may obtain hashes and types or type counts about nodes 652, 653 that do not occur in the hash tree. Generally, collection unit 631 may obtains data for dummy nodes for which computations by counting unit 632 and/or hashing unit 633 can be completed successfully, e.g., without any runtime errors, while not necessarily resulting in the correct top hash of the hash tree being computed.

The iteratively repeated computation may further comprise hashing unit 633 computing a hash of the current node and a set of hashes of ancestors of the current node, the computed hashes comprising the top hash, computing a hash of an ancestor of the current node being based on counting unit 632 computing a type count of said ancestor from types or type counts of children of said ancestor, the children of said ancestor being comprised in the set of proof nodes and the current node. For instance, for current node 648 that is a result node, counting unit 632 and hashing unit 633 may compute hashes of ancestors 642, 644 including top hash 642.2. Top hash 642 generally corresponds to a known top hash 655, e.g., provided as an input to the verifiable computation as above. For current node 651 that is a dummy node, counting unit 632 and hashing unit 633 may compute hashes of ancestor nodes 654, 642', including a top hash 642.2', that may not be nodes of the hash tree. For example, top hash 642.2' does not generally match known top hash 655. As above, the hash and set of hashes may be computed as a verifiable computation, a cryptographic verifiable computation proof proving that this computation was performed correctly. Counting unit 632 and/or hashing unit 633 may operate analogously to, e.g., be adapted from, respective counting and hashing units 832 and 833. Advantageously, hashing unit 632 and/or counting unit 633 may perform the same computation regardless of whether the current node is a result node or a dummy node, or at least it may not be observable from the cryptographic verifiable computation proof whether the current node is a result node or a dummy node. Thereby, the number of result nodes for which the iteratively repeated computation was performed is hidden, allowing to hide this sensitive information from proof verification device.

The iteratively repeated computation may also comprise root hash verification unit 636 verifying as a verifiable computation that the computed hash of the root node of the hash tree 642.2, 642.2' matches the known top hash 655 if the current node 648, 651 is not a dummy node 651. The cryptographic verifiable computation proof may further prove that this verification succeeded. For example, root hash verification unit 636 may compute a value E that is zero if the computed hash of the root node 642.2, 642.2' matches, e.g., is equal to, top hash 655, and non-zero otherwise; multiply this value E by flag δ that is zero if the current node is a dummy node, e.g., dummy node 651, and nonzero otherwise, e.g., it is a result node, e.g., node 648; and assert that E·δ=0. For example, assertion E·δ=0 may only fail if the current node is a result node and the computed top hash does not match the known top hash 655 and may succeed despite mismatches for dummy nodes. Thereby, the verifiable computation may guarantee that result nodes occur in the hash tree while allowing dummy nodes that do not occur in the hash tree.

The iteratively repeated computation may additional comprise node computation unit 637, e.g., implemented by node computation unit 837, performing a node computation on the hash preimage of current node 648, 651 as a verifiable computation. Node computation unit 637 may use a dummy flag in a node computation and/or to postprocess a result of a node computation, e.g., to ignore results of a node computation on a dummy node. For instance, the node computation may comprise asserting that the current node satisfies a particular property; node computation unit 637 may be configured to assert that either the current node satisfies the property, or it is a dummy node, e.g., the dummy flag is set. As another example, node computation unit 637 may compute an aggregate of node computation outputs in which only contributions of non-dummy nodes are taken into account, e.g., nodes for which the dummy flag is not set, e.g., by multiplying a respective node computation output by a respective dummy flag. Collection unit 631 may choose hash preimages of dummy nodes such that node computation unit 637 can successfully complete the node computation, e.g., without runtime errors, and/or that the node computation for dummy nodes has a particular predefined result, e.g., that a property to be satisfied is satisfied or a contribution to an aggregate is zero. Generally, the verifiable computation of the node computation may be performed in such a way that the cryptographic verifiable computation proof does not allow to observe whether the node computation was applied on a result or dummy node, thereby allowing to perform node computations without disclosing the potentially sensitive size of the set of result nodes.

Returning to FIG. 5*a*, as discussed above, counting unit 832 may compute a type count of an ancestor of the current node from types or type counts of children of said ancestor. In some embodiments, in order to compute this type count as a verifiable computation, hash tree proving device asserts that a weighted sum of bits of bitwise representations of the type count of the ancestor and types or type counts of children the ancestor equals zero. For example, the type count of the ancestor may comprise a number c of descendants of the ancestor having the given type. This number may be represented bitwise by variables $c_1, \ldots, c_n$ of the verifiable computation, for some value of n, e.g., a hard-coded or configurable value, e.g., as a linear combination of the variables, e.g., $c=c_1+2\cdot c_2+\ldots+2^{n-1}\cdot c_n$. Type counts of children may be represented similarly, e.g., a left child may have number of descendants d of the given type, represented by variables $d_1, \ldots, d_n$ of the verifiable computation as $d=d_1+2\cdot d_2+\ldots+2^{n-1}\cdot d_n$ and a right child may have number of descendants e of the given type, represented by variables $e_1, \ldots, e_n$ of the verifiable computation as $e=e_1+2\cdot e_2+\ldots+2^{n-1}\cdot e_n$. Counting unit 832 may compute type count c from type counts d and e as a verifiable computation by computing the value of c from the values of d and e, e.g., by computing the values of d and e from their bitwise representations; computing the value of c from the values of d and e; computing bit representation $c_1, \ldots, c_n$ from the value of c; and/or asserting as a verifiable computation that variables $c_1, \ldots, c_n$ comprised by the bitwise representation are bits and/or that the bitwise representation of c equals the sum of the bitwise representations of d and e. Asserting that variables $c_1, \ldots, c_n$ are bits may be performed by asserting that respective quadratic equations are zero, e.g., by asserting that $c_1\cdot(1-c_1)=0, \ldots, c_n\cdot(1-c_n)=0$. Asserting that the bitwise representation of c equals the sum of the bitwise representations of d and e may be performed by asserting that a weighted sum of bits of the bitwise representations equals zero, e.g., $c_1+2\cdot c_2+\ldots+2^{n-1}\cdot c_n-d_1-2\cdot d_2-\ldots-2^{n-1}\cdot d_n-e_1-2\cdot e_2-\ldots-2^{n-1}\cdot e_n=0$. The assertion may comprise multiple equations that are verified, e.g., a set of equations $c=c_1+2\cdot c_2+\ldots+2^{n-1}\cdot c_n$, $d=d_1+2\cdot d_2+\ldots+2^{n-1}\cdot d_n$, $e=e_1+2\cdot e_2+\ldots+2^{n-1}\cdot e_n$, $c=d+e$ that together imply that a weighted sum of bits of bitwise representations of the type count of the ancestor and types or type counts of children of the ancestor equals zero.

Using bitwise representations may have the advantage of ensuring that no overflow occurs during the verifiable computation, e.g., the verifiable computation system used may only guarantee correctness of computations modulo a modulus, e.g., a prime modulus, and the use of bitwise representations may guarantee that represented values are bounded, e.g., c, d, $e<2^n$. The number of bits used to represent type counts may differ per type count, e.g., type counts at higher levels of the hash tree may be represented by more bits than type counts at lower levels of the tree. A type count may comprise numbers of descendants of more than one type, e.g., a number of descendants of each specific type from a set of types, and/or a type count may comprise numbers of descendants of the given type of children of the node. In such cases, the type count computation may comprise asserting that a weighted sum of bits of bitwise representations of such a number of descendants of the ancestor or such a numbers of descendants of a child of the ancestor equals zero.

Figure 5B:
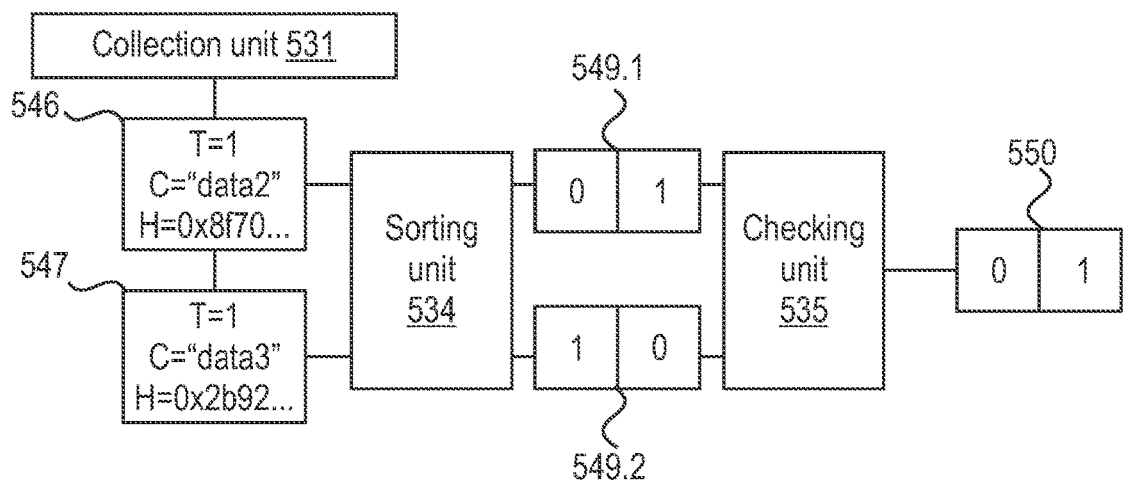

FIG. 5*b* shows an example of an embodiment of a hash tree proving device. Hash tree proving device 514 is a hash tree computation device, e.g., it may be hash tree computation device 110, 111, or hash tree proving device 114. Hash tree proving device 514 may comprise collection unit 531, e.g., as described before, e.g., collection unit 531 obtains a set of result nodes 546, 547, e.g., leaf nodes of a hash tree having a given type. Hash tree proving device 514 is configured to perform a distinctness computation checking that result nodes in the set of result nodes have distinct positions in the hash tree as a verifiable computation. The cryptographic verifiable computation proof constructed by tree proving device 514, e.g., cryptographic verifiable computation proof 174, proves that the distinctness computation was performed correctly. This has the advantage that hash tree proving device 514 can show to a proof verification device, e.g., proof verification device 115, that the set of result nodes is distinct. Since the size of the set of result nodes matches the type count of the root node of the hash tree, this may help to guarantee that all result nodes are comprised by the set of result node, e.g., in cases where proof verification device 115 is not otherwise able to determine this, e.g., proof verification device 115 does not learn hash preimages of the result nodes. The distinctness computation may be performed by sorting unit 534 and increasement checking unit 535.

Sorting unit 534 sort may sort the set of result nodes by position. For example, sorting unit 534 may sort nodes of the tree, e.g., lexicographically, e.g., such that nodes in a left subtree of a node occur before nodes in a right subtree of a node. For example, a position of a node may be represented as a path from the root to the node, e.g., by a sequence of integers, indicating which child of a respective node to take along the path from the root to the node. For example, the hash tree may be a binary tree, an integer in the sequence of integers being zero indicating a left child and being one indicating a right child. For example, position 549.1 of node 546 comprises bits $p_0=0$ and $p_1=1$, indicating that node 546 may be reached from the top of the hash tree by taking the left child from the root and the right child from there. Similarly, position 549.2 of node 547 comprises bits $s_0=1$ and $s_1=0$, indicating that node 547 may be reached from the top of the hash tree by taking the right child from the root and the left child from there. Sorting unit 534 may sort the set of result nodes such that node 546 comes before node 547 since the bitstring formed by position bits 0 and 1 comes lexicographically before the bitstring formed by position bits 1 and 0. Sorting unit 534 may use any sorting algorithm, e.g., quicksort or bubble sort, to sort the set of result nodes. Other orderings of positions of result nodes may be used instead of a lexicographic order, e.g., the order of the bits of positions 549.1 and 549.2 may be reversed. Sorting unit 534 may also be combined with other units, e.g., the collection unit of hash tree proving device 531 may be configured such that it outputs a sorted set of result nodes, e.g., by traversing the set of nodes from left to right while obtaining the set of result nodes.

Advantageously, positions 549.1, 549.2 of result nodes may be used while computing the set of hashes of ancestors of the result node, thereby providing a proof that the position of the result node is correct with respect to the top hash. For example, position p of the current node of Algorithm 1 provided above may correspond to position 549.1 or position 549.2.

Increasement checking unit 535 may verify that subsequent result nodes have strictly increasing positions as a verifiable computation. For example, increasement checking unit 535 may iterate over subsequent pairs of nodes from the set of result nodes, checking for each pair of nodes that the position of the first node from the pair of nodes is strictly smaller than the position of the second node from the pair of nodes. For example, increasement checking unit 535 may start with the first and second node, proceed with the second and third node, etcetera; or increasement checking unit 535 may start with the last and one-but-last node, proceed with the one-but-last node and second-but-last node, etcetera.

Increasement checking unit 535 may check that the position of the first node, e.g., node 546, is strictly smaller than the position of the second node, e.g., node 547, for example, by computing a position increase 550. For example, increasement checking unit 535 may compute an integer representation of the position of the first node, e.g., an integer p corresponding to binary representation $p_0, p_1, \ldots, p_{n-1}$, 549.1, of the first node, e.g., $p=\Sigma 2^{n-i-1} \cdot p_i=1$ and an integer representation of the position of the second node, e.g., an integer s corresponding to binary representation $s_0, s_1, \ldots, s_{n-1}$, 549.2, of the second node, e.g., $s=\Sigma 2^{n-i-1} \cdot s_i=2$, and compute position increase t, 550 as the difference between the two integer representations, e.g., $t=s-p=1$. Increasement checking unit 535 may then assert as a verifiable computation that the position increase 550 is positive and non-zero and equals the difference between the two integer representations of the positions. For example, increasement checking unit 535 may compute a bitwise representation $t_0, \ldots, t_{n-1}$ of position increase 550 and assert as a verifiable computation that the bitwise representation comprises bits, e.g., that $t_0 \cdot (1-t_0)=0, \ldots, t_{n-1} \cdot (1-t_{n-1})=0$, that it equals the difference between the positions, e.g., that $\Sigma 2^{n-i-1} \cdot s_i - \Sigma 2^{n-i-1} \cdot p_i = \Sigma 2^{n-i-1} \cdot t_i$, and/or that it is nonzero, e.g., $\Sigma 2^{n-i-1} \cdot t_i \neq 0$. Several various will be apparent, e.g., position increase 550 may represent the difference minus one in which case it is not necessary to prove that it is nonzero. The use of bitwise representations may ensure correctness, e.g., prevent underflow, when computing the difference between subsequent positions.

Embodiments comprising an increasement checking unit 535 may be combined with embodiments wherein the set of result nodes is a subset of an extended result set, the extended result set comprising dummy nodes, as described above. In such cases, the verification that subsequent result nodes have strictly increasing positions may comprise a check that a present node is a result node, e.g., a non-dummy node, e.g., using a dummy flag. For instance, increasement checking unit 535 may assert that either the present node is a dummy node, e.g., the dummy flag is not set, or the preceding node is not a dummy node, e.g., the dummy flag is not set and the position is strictly increasing from the previous node to the present node. The extended result set may comprise the set of result nodes with dummy nodes appended at the end, in which case this assertion may guarantee that the result nodes in the extended result set are distinct. Increasement checking unit 535 and/or a hashing unit of hash tree proving device 531 may be further configured to compute a top hash based on a type count comprising the number of non-dummy nodes in the extended result set, e.g., this may guarantee that the number of non-dummy nodes in the extended result set is correct.

Algorithm 2 below is an example of an algorithm that may be executed to compute a top hash and compare it to a known top hash by a hash tree proving device according to an embodiment, e.g., by counting unit 832 and/or hashing unit 833 of hash tree proving device 814. The hash tree may be a binary tree; the hash preimage of a leaf node may be defined as $\delta_{t,1}|\delta_{t,2}| \ldots |\delta_{t,152}|n$ as described above; and the hash preimage of an internal node may be defined as $c_1+c'_1|c_2+c'_2| \ldots |c_{152}+c'_{152}|H(n_l)|H(n_r)$ as described above.

Algorithm 2 Oblivious hash tree authentication with counts

Require: $h' \in \{0,1\}^{1216}$: known top hash of a hash tree of depth d;
    $[p] \in \{0,1\}^{d-1}$: position of current node;
    $[t] \in [1,152]$: given type;
    $[n_0] \in \{0,1\}^{2432}$: content of current node;
    $[n_i] = ([c_{i,1}'] | \ldots | [c_{i,152}'] |^{\cdot}) \in \{0,1\}^{7296}$: hash preimage sibling at level $i \in [1, d-1]$;
    $[c_{i,1}], \ldots, [c_{i,152}]$: type count at level $i \in [2, d]$
Ensure: Top hash computed based on given inputs matches given top hash

```
1:  function LogVerifyTot(h', [p], [t], [n_0], {[n_i]}, {[c_{i,1}], ... , [c_{i,152}]})
2:      AssertBitstring([p])                              // correct position
3:      [c] ← ((0, ... ,0, [t] = 1), ... , (0, ... ,0, [t] = 152))  // ints encoded as 32 bits
4:      Assert([c_1] + ... + [c_152] = 1)                 // correct node type
5:      AssertBitstring([n_0])                            //correct node
6:      [h] ← H([c_1]|[c_2]|... |[c_152]|[n_0])
7:      for i = 1, ... , d − 1 do
8:          AssertBitstring([n_i])
9:          for j = 1, ... , 152 do
10:             AssertBitstring([c_{i+1,j}])
11:             Assert([Σ_k 2^{32−k} (c_{i,j,k} + c_{i,j,k}' − c_{i+1,j,k})] = 0)
12:         [h_i] ← H(n_i)
13:         [h_L] ← [h] + [p_i] · ([h_i] − [h])
```

| Algorithm 2 Oblivious hash tree authentication with counts |
| --- |
| 14:     $[h_R] \leftarrow [h_i] + [p_i] \cdot ([h] - [h_i])$ |
| 15:     $[h] \leftarrow H([c_{i+1,1}]| \ldots |[c_{i+1,152}]|[h_L]|[h_R])$ |
| 16:   Assert$([h] - h' = 0)$ |

Algorithm 2 may be implemented using the Geppetri toolset as described in Section 6 of "Pinocchio-Based Adaptive zk-SNARKs and Secure/Correct Adaptive Function Evaluation", Meilof Veeningen, proceedings of AFRICACRYPT 2017, included herein by reference. For example, in hash tree verification system 103, hash tree proving device 114 may, using the Geppetri Python implementation, run Algorithm 2. Using the "qapprove" tool, hash tree proving device 114 may produces cryptographic verifiable computation proof 174, e.g., a zero-knowledge proof, that the algorithm was executed correctly. Proof verification device 115 may use the "qapver" tool to verify cryptographic verifiable computation proof 174, e.g., with respect to known top hash h'. Both devices may use key material produced using the "qapgenf" tool, e.g., by an external trusted device.

For example, hash tree proving device 114 may run algorithm LogVerifyTot for each result node in a set of result node and/or assert that value $[c_{d,t}]$ representing a number of descendants of the given type is equal to the size of the set of result nodes and/or perform a node computation on current node contents $n_0$, with proof verifying device 115 verifying the cryptographic verifiable computation proof proving correctness of the respective computations.

In Algorithm 2, private values, which may be witnesses, internal variables, and/or committed inputs of the verifiable computation, are written with square brackets (e.g., [x]) and public values, e.g. hardcoded values and/or input or output values known by proof verification device 115, are written without square brackets (e.g., x). The algorithm may receive as input the known top hash h', encoded as a bitstring. As private input, e.g., witness of the verifiable computation, it may receive position [p] of the current node and content $[n_0]$ of the current node, encoded as bitstrings; type [t] of the current node; the hash preimages $[n_i]$ of siblings of the current node, and the type counts $[c_{i,1}], \ldots, [c_{i,152}]$ comprising numbers of descendants for possible types 1, ..., 152 for ancestors of the current node. Algorithm 2 may take a bitwise representation of these numbers, e.g., 32-bit numbers, e.g., a value v is encoded by bits $v_1, \ldots, v_{32}$ such that $\Sigma 2^{32-k} v_k = v$. The algorithm may follow steps similar to those in Algorithm 1 but may additionally check that arguments provided to it, e.g., by collection unit 831, are in an expected domain, e.g., in lines 2, 5, and 8. This may be done since variables in Geppetri can in general have any value from a large field that is computed over, so this check may be beneficial to help guarantee that values are actually from the intended input domain.

Algorithm 2 uses several basic operations of Geppetri, as described in "Pinocchio-Based Adaptive zk-SNARKs and Secure/Correct Adaptive Function Evaluation", Meilof Veeningen, proceedings of AFRICACRYPT 2017, included by reference, including addition, multiplication, and asserting statements of the form $[a] \cdot [b]=[c]$. Other operations used in Algorithm 2 may be implemented as follows:

AssertBitstring([v]): check that vector [v] of length L contains only bits by, for i=1, ..., L, asserting that $[v_i] \cdot (1-[v_i]) = 0$;

$[x]=C$: return 1 if x=C and 0 otherwise by computing $1-[x \neq C]$ with $[x \neq C]$ described in "Pinocchio-Based Adaptive zk-SNARKs and Secure/Correct Adaptive Function Evaluation";

Assert$([x]=C)$: by asserting that $0 \cdot 0 = [x] - C$;

$[h] \leftarrow H([p])$: compute Ajtai-GGH hash for public matrix M by computing vector $M \cdot [p]$ and taking the 19 least significant bits of each element. Note that each element [e] of the vector may be $<2^{32}$, so this may be done by computing bit decomposition $b = ([b_1], \ldots, [b_{32}])$, running VerifyBitstring(b), asserting that $[e] - \Sigma_k 2^{32-k} [b_k] = 0$, and returning the 19 least significant bits $[b_{14}], \ldots, [b_{32}]$;

addition and multiplication of vectors (lines 13-14) are done elementwise.

Algorithm 3 is an example of an algorithm that may be used in an embodiment to check in a verifiable way that all nodes of a given type in a hash tree satisfy a property φ, e.g., e.g., Algorithm 3 may be performed by counting unit 832 and/or hashing unit 833 and/or node computation unit 837 of hash tree proving device 814. The hash tree is a binary tree; the hash preimage of a leaf node may be defined as $\delta_{t,1} | \delta_{t,2} | \ldots | \delta_{t,152} | n$ as described above; and the hash preimage of an internal node may be defined as $c_1 + c'_1 | c_2 + c'_2 | \ldots | c_{152} + c'_{152} | H(n_l) | H(n_r)$ as described above.

| Algorithm 3 Oblivious check on nodes of a given type |
| --- |
| Require:  $n_0 \in \{0,1\}^{1216}$: known top hash of hash tree of depth d; |
|           t: given type; |
|           $[D_1], \ldots, [D_N]$: input data for LogVerifyTot for each node of the given type, wherein locations p are lexicographically sorted as bit vectors |
| Ensure:  All events of given type satisfy φ |
| 1:  function VerifyPolicy$^{\varphi,N,d}(n_0, t, [D_1], [D_N])$ |
| 2:     for l = 1, ..., N do |
| 3:         $([p], [n_0], \{[n_i]\}, \{[c_{i,j}]\}) \leftarrow [D_l]$ |
| 4:         Assert$([l = 1] + [l \neq 1] \cdot (\Sigma 2^k [p_k] - [p_k']) \geq 1)$   // position increasing |
| 5:         LogVerifyTot(h', [p], t, $[n_0], \{[n_i]\}, \{[c_{i,j}]\}$)         // authenticate |
| 6:         $[c] \leftarrow \varphi([p], [n_0])$         // evaluate property φ |
| 7:         Assert$([c] = 1)$         // node satisfies property |
| 8:         p' ← p         // set previous position |
| 9:     Assert$(\Sigma_k 2^{32-k} [c_{d,t,k}] = N)$   // total # of nodes of given type matches |
| 10:    Assert$(\Sigma_j (\Sigma_k 2^{32-k} [c_{d,j,k}]) \leq 2^{d-1})$   // total # of nodes does not exceed max |

Algorithm 3 may be executed with the Geppetri toolchain as described above for Algorithm 2. The number of nodes N, the property φ to be verified, and the depth d of the hash tree are constants in this particular example, e.g., key material of the verifiable computation scheme may depend on φ, N, and/or d. Property φ may takes as arguments the node and its position. Nodes may be sorted lexicographically by their position, as a bitstring, in the hash tree, which may allow checking that they are distinct by checking that each node has a larger position than the previous one (line 4). Operations may be implemented as above and/or as follows:

Assert([a]≥b): given upper bound k on the bitlength of a−b, compute a k-bit bit decomposition of a−b and prove that it is correct, e.g., consists of bits and adds up to a−b;

Assert([a]≤b): equivalent to Assert(b−[a]≥0), analogously to above.

In the various embodiments of the hash tree computation device, the hash tree providing device and the proof verification device, the communication interface may be selected from various alternatives. For example, the interface may be a network interface to a local or wide area network, e.g., the Internet, a storage interface to an internal or external data storage, a keyboard, an application interface (API), etc.

The respective devices device may have a user interface, which may include well-known elements such as one or more buttons, a keyboard, display, touch screen, etc. The respective device may also have a user interface. The user interface may be arranged for accommodating user interaction for performing top hash computation, correctness verifications, and/or result node provisions.

Storage 140, 141, 142, or 145 may be implemented as an electronic memory, say a flash memory, or magnetic memory, say hard disk or the like. Storage 140, 141, 142, or 145 may comprise multiple discrete memories together making up said storage. Storage 140, 141, 142, or 145 may also be a temporary memory, say a RAM. In the case of a temporary storage 140, 141, 142 or 145, said storage contains some means to obtain data before use, say by obtaining them over an optional network connection (not shown).

Typically, the hash tree computation device, the hash tree providing device and the proof verification device each comprise a microprocessor which executes appropriate software stored at the respective device; for example, the software may have been downloaded and/or stored in a corresponding memory, e.g., a volatile memory such as RAM or a non-volatile memory such as Flash. The various devices may also be equipped with microprocessors and memories. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, the hash tree computation device may comprise a memory circuit, a processor circuit, and optionally a communication circuit. In an embodiment, the proof verification device may comprise a communication circuit and a processor circuit. In an embodiment, the hash tree providing device may comprise a memory circuit, a communication circuit, and a processor circuit. The hash tree computation device may comprise one or more of a collection circuit, a counting circuit and a hashing circuit. The hash tree providing device may comprise one or more of a collection circuit, a counting circuit, and a hashing circuit. The circuits implement the corresponding units described herein. The circuits may be a processor circuit and storage circuit, the processor circuit executing instructions represented electronically in the storage circuits. The circuits may also be, FPGA, ASIC or the like.

The processor may be a processor circuit, which may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 7:
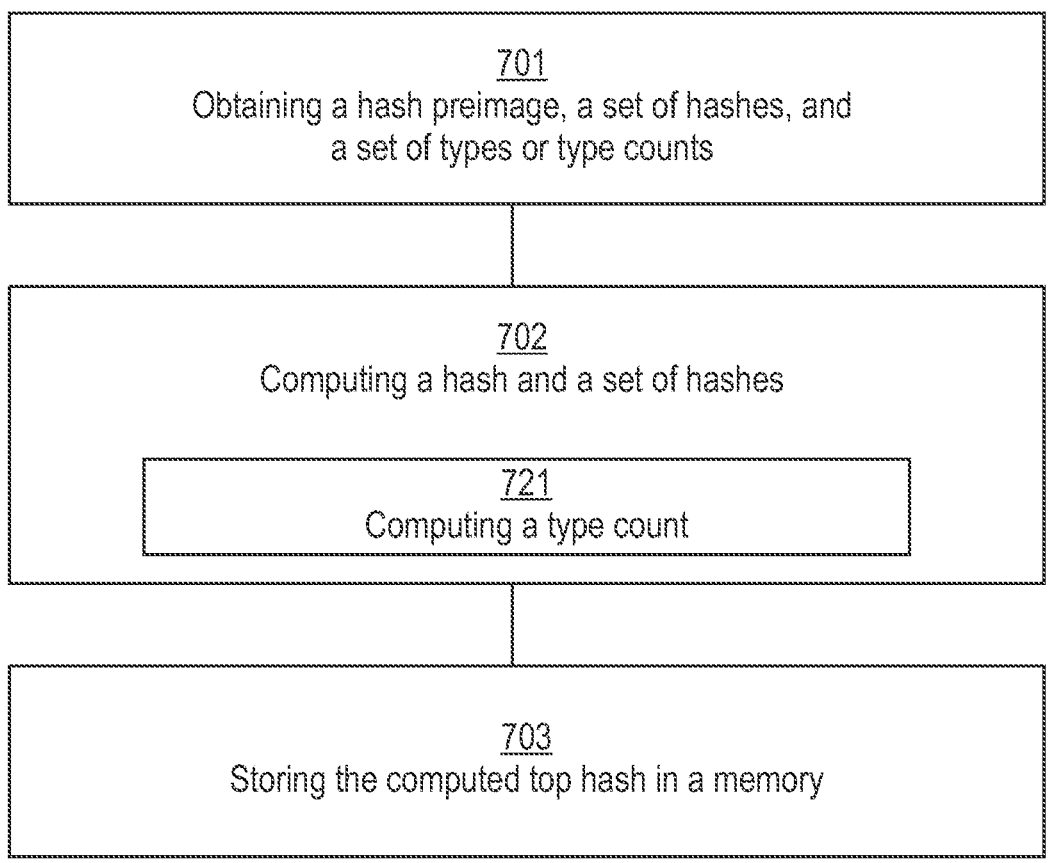

FIG. 7 schematically shows an example of an embodiment of a hash tree computation method 700. Hash tree computation method 700 is configured for computing a top hash of a hash tree with respect to a current node. The current node has a given type. The current node is a leaf node. A node of the hash tree has a hash. The top hash is a hash of a root node of the hash tree. A hash preimage of a leaf node of the hash tree comprises a content of the leaf node and a type of the leaf node. A hash preimage of an internal node of the hash tree comprises a type count of the internal node and at least one hash of a child of the internal node. A type count of an internal node of the hash tree comprises a number of descendants of the internal node having the given type. Hash tree computation method 700 comprises:

obtaining 701 a hash preimage of the current node, a set of hashes of proof nodes from a set of proof nodes, and a set of types or type counts of proof nodes from the set of proof nodes, the set of proof nodes comprising siblings of the current node and siblings of ancestors of the current node, computing 702 a hash of the current node and a set of hashes of ancestors of the current node, the computed hashes comprising the top hash, computing a hash of an ancestor of the current node comprising computing 721 a type count of said ancestor from types or type counts of children of said ancestor, the children of said ancestor being comprised in the set of proof nodes and the current node, storing 703 the computed top hash in a memory.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 701 and 702 may be executed, at least partially, in parallel. Moreover, a given step may not have finished completely before a next step is started.

Embodiments of the method may be executed using software, which comprises instructions for causing a processor system to perform method 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8A:
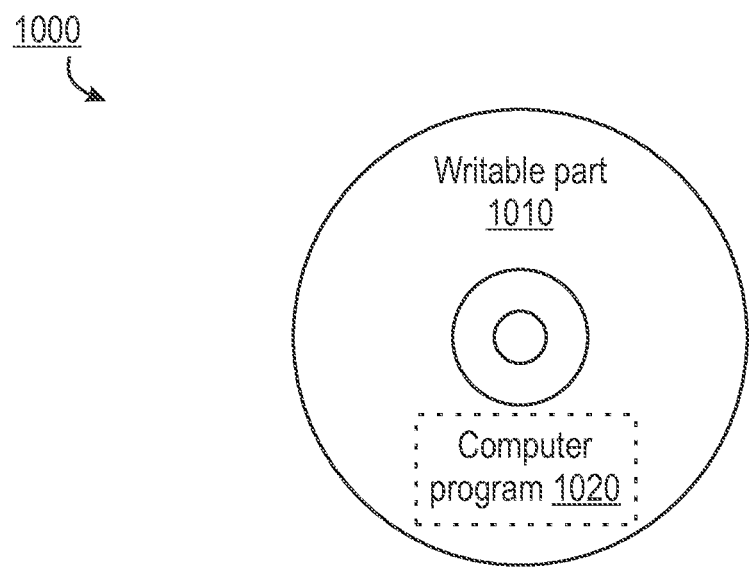

FIG. 8a shows a computer readable medium 1000 having a writable part 1010 comprising a computer program 1020, the computer program 1020 comprising instructions for causing a processor system to perform a hash tree computation method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said hash tree computation method.

Figure 8B:
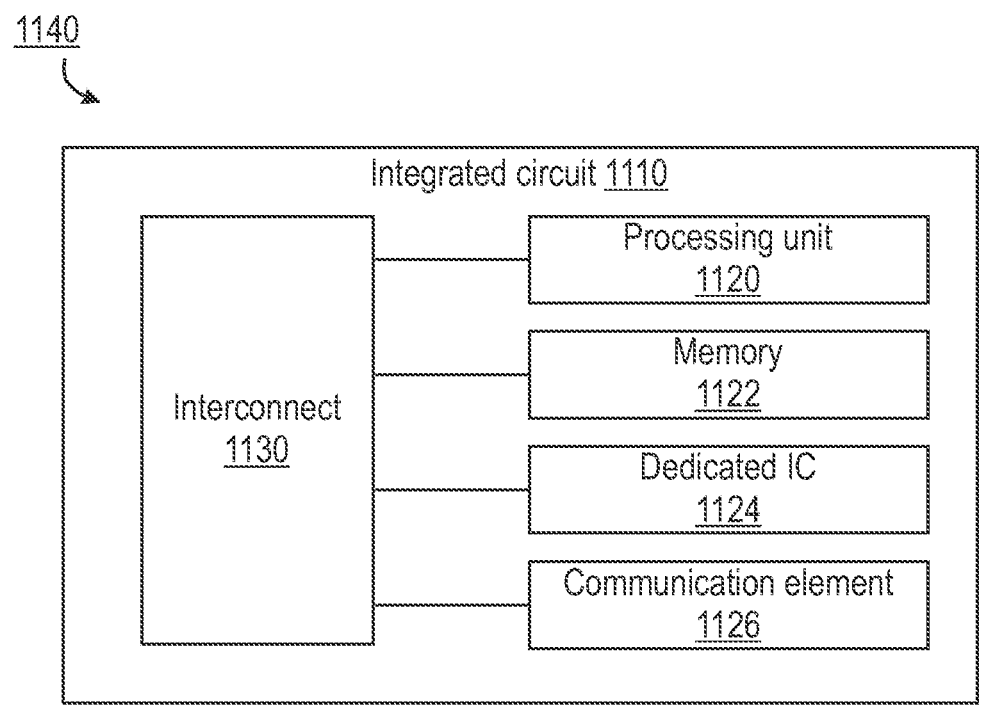

FIG. 8b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the hash tree computation device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. A hash tree computation device configured to compute a top hash of a hash tree with respect to a current node, the current node having a given type, the current node being a leaf node, a node of the hash tree having a hash, the top hash being a hash of a root node of the hash tree, a hash preimage of a leaf node of the hash tree comprising a content of the leaf node and a type of the leaf node, a hash preimage of an internal node of the hash tree comprising a type count of the internal node and at least one hash of a child of the internal node, a type count of an internal node of the hash tree comprising a number of descendants of the internal node having the given type, the hash tree computation device comprising:

a memory; and a processor configured to:

obtain a hash preimage of the current node, a set of hashes of proof nodes from a set of proof nodes, and a set of types or type counts of proof nodes from the set of proof nodes, the set of proof nodes comprising siblings of the current node and siblings of ancestors of the current node;

compute a hash of the current node and a set of hashes of ancestors of the current node, the computed hashes comprising the top hash, computing a hash of an ancestor of the current node comprising computing a type count of said ancestor from types or type counts of children of said ancestor, the children of said ancestor being comprised in the set of proof nodes and the current node; and store the computed top hash in the memory;

wherein the processor is further configured to:

obtain a set of result nodes, the set of result nodes comprising leaf nodes of the hash tree having the given type, the size of the set of result nodes matching the type count of the root node of the hash tree; and iteratively repeat a computation comprising selecting the current node from the set of result nodes, obtaining the hash preimage, set of hashes and set of types or type counts, and computing the hash and set of hashes; and wherein the processor is further configured to:

perform a distinctness computation checking that result nodes in the set of result nodes have distinct positions in the hash tree as a verifiable computation, wherein the distinctness computation comprises sorting the set of result nodes by position and verifying that subsequent result nodes have strictly increasing positions as a verifiable computation, the cryptographic verifiable computation proof further proving that the distinctness computation was performed correctly.

2. A hash tree computation device as in claim 1, wherein the hash tree computation device further comprises a communication interface configured for digital communication with a proof verification device, the processor being configured to compute the hash and the set of hashes as a verifiable computation, a cryptographic verifiable computation proof proving that said computing was performed correctly, the processor being further configured to send the cryptographic verifiable computation proof to the proof verification device.

3. A hash tree computation device as in claim 2, wherein outputs of the verifiable computation comprise the hash preimage of the current node, the processor being further configured to send the outputs of the verifiable computation to the proof verification device.

4. A hash tree computation device as in claim 2, wherein the processor is further configured to perform a node computation on the hash preimage of the current node as a verifiable computation, the cryptographic verifiable computation proof further proving that the node computation was performed correctly.

5. A hash tree computation device as in claim 4, wherein the set of result nodes is a subset of an extended result set, the extended result set comprising dummy nodes, the processor being configured to select the current node from the set of result nodes by selecting the current node from the extended result set, the processor being further configured to iteratively repeat verifying as a verifiable computation that the computed top hash matches a known top hash if the current node is not a dummy node, the cryptographic verifiable computation proof further proving that said verification succeeded.

6. A hash tree computation device as in claim 2, wherein the processor is configured to compute a type count of an ancestor of the current node as a verifiable computation by asserting that a weighted sum of bits of bitwise representations of the type count of the ancestor and types or type counts of children the ancestor equals zero.

7. A hash tree computation device as in claim 1, wherein the hash tree computation device further comprises a communication interface configured for digital communication with a hash tree providing device, the processor being configured to receive the hash preimage of the current node from the hash tree providing device, and, in at least one iteratively repeated computation, receive at least one of a type, a type count, a hash, and a hash preimage of a proof node from the set of proof nodes from the hash tree providing device, the processor being further configured to compare the computed top hash to a known top hash.

8. A hash tree computation device as in claim 1, wherein the memory is further configured to store hashes and type counts of internal nodes and hashes and hash preimages of leaf nodes of the hash tree before an update phase, computing the set of hashes taking place in the update phase, the hash tree computation device being further configured to store one or more of the hash and hash preimage of the current node and the computed hashes and type counts of ancestor nodes of the current node in the memory after the update phase.

9. A hash tree computation device as in claim 1, wherein a type count of an internal node comprises a number of descendants of a child of the internal node having the given type, or wherein the processor is further configured to obtain a hash and of a proof node by obtaining a hash preimage of the proof node and computing the hash therefrom.

10. A hash tree computation device as in claim 1, wherein a leaf node of the hash tree represents an audit log event.

11. A hash tree computation method configured for computing a top hash of a hash tree with respect to a current node, the current node having a given type, the current node being a leaf node, a node of the hash tree having a hash, the top hash being a hash of a root node of the hash tree, a hash preimage of a leaf node of the hash tree comprising a content of the leaf node and a type of the leaf node, a hash preimage of an internal node of the hash tree comprising a type count of the internal node and at least one hash of a child of the internal node, a type count of an internal node of the hash tree comprising a number of descendants of the internal node having the given type, the hash tree computation method comprising:
  obtaining a hash preimage of the current node, a set of hashes of proof nodes from a set of proof nodes, and a set of types or type counts of proof nodes from the set of proof nodes, the set of proof nodes comprising siblings of the current node and siblings of ancestors of the current node;
  computing a hash of the current node and a set of hashes of ancestors of the current node, the computed hashes comprising the top hash, computing a hash of an ancestor of the current node comprising computing a type count of said ancestor from types or type counts of children of said ancestor, the children of said ancestor being comprised in the set of proof nodes and the current node;
  storing the computed top hash in a memory;
  obtaining a set of result nodes, the set of result nodes comprising leaf nodes of the hash tree having the given type, the size of the set of result nodes matching the type count of the root node of the hash tree;
  iteratively repeating a computation comprising selecting the current node from the set of result nodes, obtaining the hash preimage, set of hashes and set of types or type counts, and computing the hash and set of hashes; and
  performing a distinctness computation checking that result nodes in the set of result nodes have distinct positions in the hash tree as a verifiable computation, wherein the distinctness computation comprises sorting the set of result nodes by position and verifying that subsequent result nodes have strictly increasing positions as a verifiable computation, the cryptographic verifiable computation proof further proving that the distinctness computation was performed correctly.

12. A non-transitory computer readable medium comprising data representing instructions to cause a processor system to perform the method according to claim 11.

* * * * *